US010270119B2

(12) United States Patent
Leah et al.

(10) Patent No.: US 10,270,119 B2
(45) Date of Patent: Apr. 23, 2019

(54) FUEL CELL STACK ARRANGEMENT

(71) Applicant: Ceres Intellectual Property Company Limited, Horsham, West Sussex (GB)

(72) Inventors: Robert Leah, Horsham (GB); Adam Bone, Horsham (GB); Lee Rees, Horsham (GB)

(73) Assignee: Ceres Intellectual Property Company Limited, Horsham, West Sussex (GB)

( * ) Notice: Subject to any disclaimer, the term of this patent is extended or adjusted under 35 U.S.C. 154(b) by 106 days.

(21) Appl. No.: 15/125,150

(22) PCT Filed: Mar. 12, 2015

(86) PCT No.: PCT/GB2015/050729
§ 371 (c)(1),
(2) Date: Sep. 10, 2016

(87) PCT Pub. No.: WO2015/136295
PCT Pub. Date: Sep. 17, 2015

(65) Prior Publication Data
US 2016/0380298 A1 Dec. 29, 2016

(30) Foreign Application Priority Data

Mar. 12, 2014 (GB) .................................. 1404373.1
Apr. 11, 2014 (GB) .................................. 1406586.6

(51) Int. Cl.
*H01M 8/247* (2016.01)
*H01M 8/0206* (2016.01)
*H01M 8/12* (2016.01)
*H01M 8/2425* (2016.01)
*H01M 8/2465* (2016.01)
*H01M 8/04082* (2016.01)
*H01M 8/124* (2016.01)

(52) U.S. Cl.
CPC ......... *H01M 8/247* (2013.01); *H01M 8/0206* (2013.01); *H01M 8/04082* (2013.01); *H01M 8/12* (2013.01); *H01M 8/2425* (2013.01); *H01M 8/2465* (2013.01); *H01M 2008/1293* (2013.01)

(58) Field of Classification Search
CPC ...... H01M 8/12; H01M 8/0206; H01M 8/247; H01M 8/2425
See application file for complete search history.

(56) References Cited

U.S. PATENT DOCUMENTS 5,858,314 A 1/1999 Hsu et al.
8,785,063 B2 7/2014 Yang et al.
(Continued)

FOREIGN PATENT DOCUMENTS

CA 2428959 A1 11/2003
CN 102468512 A 5/2012
(Continued)

OTHER PUBLICATIONS

Search Report dated Oct. 13, 2014, in corresponding GB Application No. 1406586.6.
(Continued)

*Primary Examiner* — Karie O'Neill Apicella
(74) *Attorney, Agent, or Firm* — Thomas B. Ryan; Harter Secerst & Emery LLP

(57) ABSTRACT

The present invention is concerned with improved fuel cell stack assembly arrangements.

18 Claims, 12 Drawing Sheets

(56) References Cited

U.S. PATENT DOCUMENTS

| | | |
|---|---|---|
| 2003/0211379 A1 | 11/2003 | Morrow et al. |
| 2003/0215693 A1 | 11/2003 | Asai et al. |
| 2004/0265667 A1* | 12/2004 | Kato .................. H01M 8/04029 429/434 |
| 2006/0090397 A1* | 5/2006 | Edlund .................. B01J 19/249 48/61 |
| 2006/0110649 A1 | 5/2006 | Nishiyama et al. |
| 2009/0004532 A1* | 1/2009 | Haltiner, Jr. .......... H01M 8/124 429/457 |
| 2009/0148746 A1 | 6/2009 | Kato et al. |
| 2010/0233564 A1 | 9/2010 | Haltiner, Jr. et al. |
| 2012/0121997 A1 | 5/2012 | Yang et al. |

FOREIGN PATENT DOCUMENTS

| | | |
|---|---|---|
| DE | 102007061061 A1 | 6/2010 |
| EP | 2426772 A1 | 3/2012 |
| EP | 2775557 A1 | 9/2014 |
| GB | 2447136 A | 3/2008 |
| JP | 562241267 A | 10/1987 |
| JP | H0722049 A | 1/1995 |
| JP | H10228918 A | 8/1998 |
| JP | 2007213882 A | 8/2007 |
| JP | 2007250338 A | 9/2007 |
| JP | 2008130350 A | 6/2008 |
| JP | 2008226713 A | 9/2008 |
| JP | 2010073448 A | 4/2010 |
| JP | 2010519716 A | 6/2010 |
| JP | 2011210589 A | 10/2011 |
| KR | 20130075992 A | 7/2013 |
| RU | 2 175 799 C2 | 11/2001 |
| RU | 2 227 348 C2 | 4/2004 |
| WO | 97/39490 A1 | 10/1997 |
| WO | 00/26983 A1 | 5/2000 |
| WO | 02/35628 A1 | 5/2002 |
| WO | 03/007582 A1 | 1/2003 |
| WO | 2004/089848 A1 | 10/2004 |
| WO | 2005/078843 A1 | 8/2005 |
| WO | 2006/079800 A1 | 8/2006 |
| WO | 2006/106334 A1 | 10/2006 |
| WO | 2007/085863 A1 | 8/2007 |
| WO | 2007/110587 A2 | 10/2007 |
| WO | 2008/001119 A2 | 1/2008 |
| WO | 2008/003976 A1 | 1/2008 |
| WO | 2008/015461 A1 | 2/2008 |
| WO | 2008/053213 A1 | 5/2008 |
| WO | 2008/104760 A1 | 9/2008 |
| WO | 2008/132493 A2 | 11/2008 |
| WO | 2009/090419 A2 | 7/2009 |
| WO | 2010/020797 A1 | 2/2010 |
| WO | 2010/061190 A2 | 6/2010 |
| WO | 2013/164573 A1 | 11/2013 |
| WO | 2015/004419 A1 | 1/2015 |

OTHER PUBLICATIONS

Search Report dated Oct. 21, 2014, in corresponding GB Application No. 1404373.1.
International Search Report dated May 27, 2015, in corresponding PCT Application No. PCT/GB2015/050729.
Korean Search and Examination Report dated Feb. 18, 2018.
Search Report for Russian national stage of PCT/GB2015/050729 dated Oct. 31, 2018.

* cited by examiner

FUEL CELL STACK ARRANGEMENT

FIELD OF THE INVENTION

The present invention is concerned with improved fuel cell stack assembly arrangements.

BACKGROUND OF THE INVENTION

Teachings of fuel cells, fuel cell stacks, fuel cell stack assemblies, and heat exchanger systems, arrangements and methods are well known to one of ordinary skill in the art, and in particular include WO02/35628, WO03/07582, WO2004/089848, WO2005/078843, WO2006/079800, WO 2006/106334, WO 2007/085863, WO 2007/110587, WO 2008/001119, WO 2008/003976, WO2008/015461, WO2008/053213, WO2008/104760, WO2008/132493, WO2009/090419, WO2010/020797, WO2010/061190, and WO2015/004419. All publications referenced herein and their references are incorporated herein by reference in their entirety. Definitions of terms used herein can be found as necessary in the above publications. In particular, the present invention seeks to improve the systems and methods disclosed in WO 2007/085863 and WO2008/104760.

Fuel Cell Temperature Variation, Start-Up and Shut-Down

Significant challenges in mechanical, electrical and thermal design are encountered when designing SOFC (solid oxide fuel cell) stacks, particularly IT-SOFC (intermediate temperature solid oxide fuel cell) stacks, which are required to operate in an efficient manner which caters for start-up, dynamic operation, and shut-down. One feature of all SOFC stacks is that their operating performance is affected by the temperature that they operate at, and hence they can be significantly affected by the environmental temperature they operate in. This is principally due to temperature being a significant factor in determining the rate at which the SOFC electrochemical reaction takes place, and thus output voltage, current, and efficiency.

In a planar SOFC stack arrangement, a stack of cells is typically arranged in a stacking direction from one end of the stack (e.g. from a base plate end) to the other end (e.g. to an end plate end). In this arrangement, the operating performance of the fuel cells/fuel cell stack repeat layers that are located at either end are affected by the temperature of the ends of the SOFC stack. It is common for the SOFC stack, when operating, to have a temperature different to that of its surroundings. The planar arrangement of the fuel cells in the fuel cell stack means that the fuel cells have their operating temperature affected by the temperature of the immediate, adjacent layers. The relatively large thermal masses of the base plate and end plate act as thermal sinks during a typical start-up, and as thermal sources during a typical shut-down and are thermally dynamically slower than the fuel cells during operation. Thus, the operating temperatures of the adjacent fuel cells is reduced or increased accordingly.

When a fuel cell stack assembly is operating after start-up, it is common for the fuel cell stack to operate at a higher temperature than adjacent components, and thus the end and base plates can act as thermal sinks, lowering the operating temperature of the fuel cell stack end cells. This can reduce the temperature of several of the fuel cell layers at the ends of the fuel cell stack.

Thus, it is possible for the temperature of the operating environmental of the fuel cells at the centre of the fuel cell stack to be different to the temperatures of the fuel cells at the ends of the fuel cell stack.

This "end effect" can result in a drop in fuel cell electrochemical operating performance (in particular, a voltage drop) of the fuel cells at the ends of the stack when compared to those not at the ends of the stack. This in turn reduces the overall efficiency of the stack.

The variation in temperature between fuel cells in different parts of the fuel cell stack (e.g. (a) at the top and bottom, and (b) in the middle) can also make controlling the stack temperature difficult since it results in a divergent set of temperatures of individual fuel cells within the fuel cell stack. Thus, optimising temperature to achieve the best overall efficiency can be difficult.

In a metal supported SOFC design, where the metal layers are efficient conductors of electrical current and thermal energy, these end effects can be considerable. Thus, for instance, in an IT-SOFC there can be a 80 Deg C. variation in operating temperature between the central cells and the end cells. For example, with a metal supported IT-SOFC stack made up of 100 layers and with the central cells at a steady state operating point, the difference in temperature between the central cells and the end cells can result in a greater than −150 mV (in the experiments below, up to 345 mV) operating voltage difference between the central cells and the end cells.

As well as temperature differences between individual fuel cells in a fuel cell stack causing problems with fuel cell stack voltage and power output, problems are also encountered in the form of "thermal lag" where the thermal mass (i.e. the thermal capacity) of fuel cell stack components (e.g. base plate and end plate) results in a thermal lag and hence a performance lag between the fuel cells adjacent to the fuel cell components and the fuel cells in the interior (e.g. the middle) of the fuel cell stack. Such a thermal lag inhibits rapid start-up (and shut-down and in operation dynamic changes) and is therefore undesirable, particularly in e.g. domestic central heating/CHP systems which may require frequent power cycling. Similar problems are encountered with e.g. auxiliary power units and emergency backup generators where a rapid start-up is highly desirable since it can reduce the requirement for alternative power supplies (e.g. batteries) and therefore reduce the associated system cost.

Thermal lag is a recognised problem with fuel cell stacks and is discussed by e.g. US2003/0211379, which suggests providing light fuel cell stack pressure plates and current collector plates, and also a thermal insulator secured between the current collector and the pressure plate. WO2013/164573 also notes the thermal lag issue existing with fuel cells, and teaches using a high power heater to enable the initial and final fuel cells in the stack to operate uniformly without excessive thermal lag. The addition of such heaters requires additional componentry, additional measurement and control, increased cost and a drop in system efficiency resulting from the additional heater power consumption.

Thus, it is highly desirable to have a stack design that allows for a more even cell operating temperature over the stack height, which allows for a more uniform cell performance over the stack, independent of cell position (e.g. from one end of the stack to the other, e.g. from the base plate end of the stack to the end plate end of the stack), an which thus reduces the coupling of (i.e. relationship between) cell location to cell performance, particularly at stack start-up and shut-down.

By reducing the difference in temperature between individual fuel cells within the stack and thereby reducing the variation in output electrical voltage and/or power levels, it may be possible to allow for a faster start-up and shut-down of the fuel cell stack by enabling a more rapid thermal balance to be achieved across the stack as the stack warms up, dynamically operates and cools down, without a significant impact on performance (particularly steady-state performance) or cost.

Other publications include JPS62241267, JPH0722049, CA2428959, US2004265667, US2009148746, US2006110649, US2010233564, US2009004532, JP2007213882, JP2007250338, JP2008130350, JP2008226713, EP2426772, DE102007061061, JP2010073448, CN102468512, KR20130075992, EP2775557, JPH10228918, and US2003/215693.

EP2426772 discloses fuel cell stack arrangements with a single dummy layer 86 at one end of the stack, intended (para [0012]) to absorb load and reduce damage to electrolyte electrode assemblies of other fuel cell stack layers, and improve thermal insulation of the active layers of the stack from the adjacent reformer 16. Fuel flow across the dummy layer is blocked, and power take off (FIG. 8) is from end plates 88a, 88b. Notably, the dummy layer includes a dummy electrolyte electrode assembly. Electrical current flow to and from the dummy electrolyte electrode assembly is by way of surface-to-surface metal contact. The relevant metal surfaces are subject to significant oxidation and/or corrosion over the life of the product and thus to a significant or substantial increase in electrical resistance between them. Thus, a significant increase in electrical resistance across the dummy layer will be experienced over the life of the product, resulting in decreased efficiency and power output.

The present invention seeks to improve upon the prior art and/or address, overcome or mitigate at least one of the prior art disadvantages.

SUMMARY OF THE INVENTION

According to the present invention there is provided an intermediate-temperature solid oxide fuel cell (IT-SOFC) stack assembly comprising:
(i) a base plate;
(ii) at least one intermediate-temperature solid oxide fuel cell stack mounted upon said base plate;
(iii) an end plate; and
(iv) clamping means adapted to exert compressive force upon said at least one fuel cell stack between said base plate and said end plate,
each fuel cell stack having first and second ends, each fuel cell stack arranged mounted between said base plate and said end plate, and comprising at least one electrochemically active fuel cell stack repeat layer and at least one of:
(a) an at least one electrochemically inactive fuel cell stack repeat layer positioned between said base plate and said at least one electrochemically active fuel cell stack repeat layer; and
(b) an at least one electrochemically inactive fuel cell stack repeat layer positioned between said end plate and said at least one electrochemically active fuel cell stack repeat layer;
each electrochemically active fuel cell stack repeat layer comprising a metal substrate, anode, electrolyte and cathode layers mounted upon said metal substrate, and a metal interconnect plate, and defining an oxidant flow path from an oxidant inlet to an exhaust oxidant outlet, and a fuel flow path from a fuel inlet to an exhaust fuel outlet.
each electrochemically inactive fuel cell stack repeat layer adapted such that it is incapable of performing an electrochemical function and comprising a metal substrate and a metal interconnect plate, and defining at least one of: an oxidant flow path from an oxidant inlet to an exhaust oxidant outlet, and a fuel flow path from a fuel inlet to an exhaust fuel outlet.

As discussed in more detail below, in preferred embodiments each electrochemically active fuel cell stack repeat layer additionally comprises a metal spacer located between said metal substrate and said metal interconnect plate, and each electrochemically inactive fuel cell stack repeat layer (a) additionally comprises a metal spacer located between said metal substrate and said metal interconnect plate, and (b) defines an oxidant flow path from an oxidant inlet to an exhaust oxidant outlet. More preferably, each electrochemically inactive fuel cell stack repeat layer does not define a fuel flow path from a fuel inlet to an exhaust fuel outlet.

Typically, the fuel flow path in each electrochemically active fuel cell stack repeat layer is from the fuel inlet to the exhaust fuel outlet through a volume defined between the metal substrate, the metal interconnect plate and any metal spacer plate. Typically, the oxidant flow path in each electrochemically active fuel cell stack repeat layer is from the oxidant inlet to the exhaust oxidant outlet through a volume defined between the metal substrate and an adjacent plate e.g. an adjacent metal interconnect plate, for example of an adjacent fuel cell stack repeat layer or a power take off plate/endpole.

Typically, the oxidant flow path in each electrochemically inactive fuel cell stack repeat layer is from the oxidant inlet to the exhaust oxidant outlet through a volume defined between the metal substrate and an adjacent plate, e.g. an adjacent metal interconnect plate, for example of an adjacent fuel cell stack repeat layer or a power take off plate/endpole.

The intermediate-temperature solid oxide fuel cell (IT-SOFC) stack assembly can also be referred to as an intermediate-temperature solid oxide fuel cell (IT-SOFC) stack arrangement.

As is detailed below, the present invention achieves very significant improvements in performance—experiments have shown an approximate 6% increase in total power output without an increase in system level fuel consumption, and a significant reduction in the difference in operating voltages of individual electrochemically active fuel cell stack repeat layers. This reduced range of operating voltages means that controlling the stack to a stack voltage is simplified. It is known that it is preferable not to operate solid oxide fuel cells below a certain (safe) cell operating voltage in order to prevent damage to the cell. It is not uncommon to have a minimum operating stack voltage for each active fuel cell stack repeat layer set between 650-750 mV. It is preferable to operate at a higher cell voltage to increase system efficiency. If, as is the case with a stack of fuel cells incorporating the electrochemically inactive fuel cell stack repeat layers, the operating voltage of each repeat layer is relatively similar then it is simpler to operate the stack voltage so that all the cells operate above the minimum cell voltage. For a contrasting situation where there is a larger difference in the cell operating voltages for a given stack operating point, then to prevent damage to the fuel cell stack, the minimum voltage, and thus amount of power able to be drawn from the stack, is limited by the lowest cell operating voltage. In the example given below, the reduction in deviation of the cell voltages and resulting increase in average cell voltage means that 6% more power can be drawn from the stack for the same operating point. Whilst this offers significant power benefits for the same sized stack, it is also possible to use this increase in power potential to reduce the number of electrochemically active fuel cells (i.e. electrochemically active fuel cell stack repeat layers) used in the stack for the same stack power rating, thus reducing stack costs.

By "incapable of performing an electrochemical function" (in the context of the electrochemically inactive fuel cell stack repeat layer(s)) is meant that each electrochemically inactive fuel cell stack repeat layer is incapable of performing a designed SOFC electrochemical reaction during operation of the fuel cell stack assembly. Preferably, it is incapable of producing electricity directly from oxidizing a fuel by electrochemical conversion. Thus, the layer(s) may be described as being configured or adapted to be electrochemically inactive, i.e. adapted or configured to be incapable of performing an electrochemical function.

The or each at least one electrochemically inactive fuel cell stack repeat layer can also be referred to as being a "dummy" or "buffer" layer.

Fuel cell base plates and end plates are well known in the art. Suitable materials for the base plate and end plate include those which retain their stiffness over the range of the fuel cell stack assembly operating temperatures. For an IT-SOFC stack, the stack operating temperature is typically 450-650 Deg C. Materials include but are not limited to stainless steel 3CR12.

Preferably the metal substrate and/or power take-off plate(s) is made from stainless steel, more preferably from ferritic stainless steel.

The clamping means exerts force upon the base plate, end plate, and the at least one fuel cell stack. Suitable clamping means include e.g. tie bolts/tiebars/tension rods which act to pull the baseplate and endplate together and thus exert compressive force upon the components between them i.e. the at least one fuel cell stack. Thus, it may also be said that compressive force is exerted upon the components between the base plate and the end plate, i.e. upon the at least one intermediate-temperature solid oxide fuel cell stack. Clamping means are well known in the art and include those taught in e.g. WO2007/085863. Other clamping means will be readily apparent to one of ordinary skill in the art.

Tiebars are fabricated from materials that are chemically and mechanically thermally stable over the specified operating range and environment. In some instances it may be desirable to include an electrically insulating coating on the surface to prevent oxide growth and short circuiting to surrounding active and inactive fuel cell stack repeat layer metal parts.

Each fuel cell stack defines first and second ends, i.e. opposite ends of the fuel cell stack. Thus, a first end of a fuel cell stack can be the end adjacent or proximal the base plate, and the second end can be the end adjacent or proximal the end plate.

Each fuel cell stack is arranged mounted between the base plate and the end plate. As detailed below, additional components can be located between the base plate and a fuel cell stack, and between the end plate and a fuel cell stack. Such components include, but are not limited to, electrically insulating gaskets, thermally insulating gaskets, interconnect plates, endpoles, monopoles, and power take off plates. Thus, the base plate and end plate do not have to be directly contacted by the at least one fuel cell stack. With the presence of additional components between the base plate and the at least one fuel cell stack, and between the end plate and the at least one fuel cell stack, the base plate and end plate may be considered to be proximal, proximate or adjacent to the at least one fuel cell stack. Thus, preferably the intermediate-temperature solid oxide fuel cell stack assembly comprises a thermally and electrically insulating gasket mounted between at least one of said base plate and said at least one fuel cell stack, and said end plate and said at least one fuel cell stack.

Thus, preferably the base plate and the end plate are electrically isolated from the at least one electrochemically active fuel cell stack repeat layer. Preferably, the base plate and the end plate are electrically isolated from the at least one intermediate-temperature solid oxide fuel cell stack. Electrical isolation of the base plate and end plate from the at least one electrochemically active fuel cell stack repeat layer provides an important safety advantage in that component parts of the fuel cell stack assembly which are most prone to being contacted by people during maintenance or testing are electrically isolated from the fuel cell stack, and is a simple way of preventing other electrically conductive components that contact the base plate or end plate becoming electrically live and allows effective safety earthing of such components in a product.

The arrangement of electrochemically active fuel cell stack repeat layers and electrochemically inactive fuel cell stack repeat layers results in three possibilities:

1. Base Plate
   At least one electrochemically inactive fuel cell stack repeat layer
   At least one electrochemically active fuel cell stack repeat layer
   At least one electrochemically inactive fuel cell stack repeat layer
   End plate
2. Base Plate
   At least one electrochemically inactive fuel cell stack repeat layer
   At least one electrochemically active fuel cell stack repeat layer
   End plate
3. Base Plate
   At least one electrochemically active fuel cell stack repeat layer
   At least one electrochemically inactive fuel cell stack repeat layer
   End plate Option 1 is the most preferred.

Thus, preferably each fuel cell stack comprises at least one electrochemically active fuel cell stack repeat layer, and both:
(a) an at least one electrochemically inactive fuel cell stack repeat layer positioned between said base plate and said at least one electrochemically active fuel cell stack repeat layer; and
(b) an at least one electrochemically inactive fuel cell stack repeat layer positioned between said end plate and said at least one electrochemically active fuel cell stack repeat layer;

More preferably, each fuel cell stack comprises arranged in a direction from said base plate to said end plate:
(A) a first at least one electrochemically inactive fuel cell stack repeat layer;
(B) said at least one electrochemically active fuel cell stack repeat layer; and
(C) a second at least one electrochemically inactive fuel cell stack repeat layer.

Preferably, an at least one electrochemically inactive fuel cell stack repeat layer is adapted to block fuel flow across the anode side of the fuel cell. As is shown in the specific embodiments below, in certain embodiments, this may be caused (i.e. effected) by a blockage in the flow path across the electrochemically inactive fuel cell stack repeat layer from a fuel inlet to an exhaust fuel outlet, i.e. the electrochemically inactive fuel cell stack repeat layer may comprise a fuel inlet and/or an exhaust fuel outlet, but flow from that inlet and/or outlet across the anode side of the electrochemically inactive fuel cell repeat layer is blocked. For example, such a blockage may exist at or immediately adjacent a fuel inlet to the electrochemically inactive fuel cell stack repeat layer. Thus, in such embodiments it may be possible for fuel to pass through manifolding from the electrochemically inactive fuel cell stack repeat layer to an adjacent fuel cell stack repeat layer. Thus, fuel may enter a fuel cell stack at its bottom, passing through manifolding in at least one electrochemically inactive fuel cell stack repeat layer, and pass to an at least one electrochemically active fuel cell stack repeat layer. Similarly, such a blockage may exist at or immediately adjacent a fuel outlet of the electrochemically inactive fuel cell stack repeat layer.

Preferably, the fuel inlets of the fuel cell stack repeat layers are part of a fuel inlet manifold which defines a fluid flow path from a fuel cell stack fuel inlet to each of the fuel cell stack repeat layer fuel inlets. Preferably, the exhaust fuel outlets of the fuel cell stack repeat layers are part of an exhaust fuel outlet manifold which defines a fluid flow path from each of the fuel cell stack repeat layer exhaust fuel outlets to a fuel cell stack exhaust fuel outlet. Thus, a fluid flow path may be defined from a fuel cell stack fuel inlet to the fuel cell stack repeat layer fuel inlets via a fuel inlet manifold, across the anode side of the fuel cell stack repeat layers (where such fluid flow is not blocked) to the fuel cell stack repeat layer exhaust fuel outlets, to the fuel cell stack exhaust fuel outlet via an exhaust fuel outlet manifold.

Preferably, the oxidant inlets of the fuel cell stack repeat layers are open manifolded. Alternatively, they may be part of an oxidant inlet manifold which defines a fluid flow path from a fuel cell stack oxidant inlet to each of the fuel cell stack repeat layer oxidant inlets. Preferably, the exhaust oxidant outlets of the fuel cell stack repeat layers are part of an exhaust oxidant outlet manifold which defines a fluid flow path from each of the fuel cell stack repeat layer exhaust oxidant outlets to a fuel cell stack exhaust oxidant outlet. Thus, for a system with an open manifolded oxidant inlet, a fluid flow path may be defined from the fuel cell stack repeat layer oxidant inlets (i.e. the open manifolded oxidant inlets), across the cathode side of the fuel cell stack repeat layers (where such fluid flow is not blocked) to the fuel cell stack repeat layer exhaust oxidant outlets, to the fuel cell stack exhaust oxidant outlet via an exhaust oxidant outlet manifold. Alternatively, for a system with an internally manifolded oxidant inlet, a fluid flow path may be defined from a fuel cell stack oxidant inlet to the fuel cell stack repeat layer oxidant inlets via an oxidant inlet manifold, across the cathode side of the fuel cell stack repeat layers (where such fluid flow is not blocked) to the fuel cell stack repeat layer exhaust oxidant outlets, to the fuel cell stack exhaust oxidant outlet via an exhaust oxidant outlet manifold.

Preferably, the fuel cell stack repeat layers define the fuel inlet manifold, the exhaust fuel outlet manifold, the oxidant inlet manifold(s) (open manifolded or internally manifolded), and the exhaust oxidant outlet manifold.

Thus, in embodiments where fluid flow across the anode side of an electrochemically inactive fuel cell stack repeat layer is blocked, fluid flow may not be possible from (a) the exhaust fuel outlet or exhaust fuel outlet manifold to an internal volume/void defined between the interconnect and metal substrate (and any metal spacer) of the electrochemically inactive fuel cell stack repeat layer or (b) the fuel inlet or fuel inlet manifold to an internal volume/void defined between the interconnect and metal substrate (and any metal spacer) of the electrochemically inactive fuel cell stack repeat layer.

Alternatively, in certain embodiments an electrochemically inactive fuel cell stack repeat layer may not comprise a fuel inlet. Thus, in such embodiments fuel flow past the electrochemically inactive fuel cell stack repeat layer is not possible. Thus, it may be that such a layer is used at the opposite end of the stack to a fuel inlet to the stack. For example, an at least one electrochemically inactive fuel cell stack repeat layer at the top of a stack may not comprise a fuel inlet. Thus, there will be no fuel flow to such a layer (or the layers beyond it). Such layers may also not include an exhaust fuel outlet, thus preventing the flow of any exhaust fuel flow to the electrochemically inactive fuel cell stack repeat layers.

Alternatively or additionally, the electrochemically inactive dummy fuel cell stack layer (an at least one electrochemically inactive fuel cell stack repeat layer) may:
 comprise a fuel cell metal substrate which is non-porous and which thereby prevents flow of fuel across the fuel cell metal substrate, for example to an anode-electrolyte-cathode structure mounted thereon; and/or
 comprise a fuel cell metal substrate which does not have an anode-electrolyte-cathode structure mounted thereon.

Preferably, an at least one electrochemically inactive fuel cell stack repeat layer (for example, all electrochemically inactive fuel cell stack repeat layers) comprises a stable electrochemically conductive layer mounted upon said metal substrate. More preferably, it is mounted directly upon said metal substrate, i.e. without any intervening layers or materials. By "stable" is meant a layer that does not significantly change its chemical or physical properties under normal operating conditions. More preferably, a cathode layer is mounted upon said metal substrate, more preferably upon a non-porous metal substrate. This is particularly advantageous since the cathode material is electrically conductive (and is used on electrochemically active fuel cell stack repeat layers) and is not subject to significant or substantial changes in oxidation state over the lifecycle of the product, meaning that it is not subject to a significant or substantial increase in electrical resistance over the lifecycle of the product. Alternatively, a stable electrochemically conductive layer mounted upon said metal substrate can be an anode layer.

As discussed above, said cathode material is electrically conductive, such an electrically conducting layer may also be thermally insulating, i.e. buffering the thermal effects. Alternative materials for said cathode may be provided. Said alternative materials are electrically conductive and low thermal conductivity materials.

Where contact between electrochemically inactive fuel cell stack repeat layers does not need to be electrically conductive (discussed below), an electrochemically inactive fuel cell stack repeat layer may comprise an electrically insulating layer mounted upon said metal substrate. More preferably, it is mounted directly upon said substrate, i.e. without any intervening layers or materials. Thus, electrical conductivity between the inactive layers can be prevented, i.e. the inactive layers can be electrically insulated from one another. Such an electrically insulating layer may also be thermally insulating. For example, it may be an electrically insulating, high temperature gasket material.

In certain embodiments, the fuel inlet to a first set of electrochemically inactive fuel cell stack repeat layers (i.e.

a first at least one electrically inactive fuel cell stack repeat layer; located between a fuel inlet to the fuel cell stack assembly, typically at the base plate, and the set of electrochemically active fuel cell stack repeat layers) is arranged so that the fuel flows counter to the direction of flow of oxidant on the other side of the repeat layer. Such a first set of electrochemically inactive fuel cell stack repeat layers can be manifolded such that fuel exiting through the exhaust fuel outlet from the inactive fuel cell stack repeat layer is fed to the fuel inlet of the set of electrochemically active fuel cell stack repeat layers. Thus, the substrate in such a first set of electrochemically inactive fuel cell stack repeat layers can operate as a countercurrent heat exchanger between fuel and oxidant flows. It is common in SOFC stacks for the fuel gas feed to be pre-heated before the fuel enters the fuel cell stack, and thus when flowed through the inactive layer in this way, it can provide heating to the inactive layers, further buffering the thermal effects of the base plate and end plate.

An at least one electrochemically inactive fuel cell stack repeat layer between the base plate and the at least one electrochemically active fuel cell stack repeat layer may be considered to be between a first end of the at least one electrochemically active fuel cell stack repeat layer and the base plate. The end of the at least one electrochemically inactive fuel cell stack repeat layer remote from the at least one electrochemically active fuel cell stack repeat layer (i.e. proximal to the base plate) may be considered to define the first end of the fuel cell stack.

Where there is not an at least one electrochemically inactive fuel cell stack repeat layer between the base plate and the at least one electrochemically active fuel cell stack repeat layer, the end of the at least one electrochemically active fuel cell stack repeat layer proximal to the base plate may be considered to define the first end of the fuel cell stack.

An at least one electrochemically inactive fuel cell stack repeat layer between the end plate and the at least one electrochemically active fuel cell stack repeat layer may be considered to be between a second end of the at least one electrochemically active fuel cell stack repeat layer and the end plate. The end of the at least one electrochemically inactive fuel cell stack repeat layer remote from the at least one electrochemically active fuel cell stack repeat layer (i.e. proximal to the end plate) may be considered to define the second end of the fuel cell stack.

Where there is not an at least one electrochemically inactive fuel cell stack repeat layer between the end plate and the at least one electrochemically active fuel cell stack repeat layer, the end of the at least one electrochemically active fuel cell stack repeat layer proximal to the end plate may be considered to define the second end of the fuel cell stack.

As detailed above, each electrochemically active fuel cell stack repeat layer comprises a metal substrate, anode, electrolyte and cathode layers mounted upon the metal substrate, and a metal interconnect plate, and has an oxidant inlet, an exhaust oxidant outlet, a fuel inlet and an exhaust fuel outlet, and defines an oxidant flow path from the oxidant inlet to the exhaust oxidant outlet, and a fuel flow path from the fuel inlet to the exhaust fuel outlet. The electrochemically active fuel cell stack repeat layers can also be referred to as being "electrochemically active metal fuel cell stack repeat layers".

The anode, electrolyte and cathode layers together can be considered to define a fuel cell.

Preferably, the anode, electrolyte and cathode layers of the at least one electrochemically active fuel cell stack repeat layer have a thickness. More preferably, where there are multiple electrochemically active fuel cell stack repeat layers this thickness is the same in each layer, or varies within ±20%, more preferably ±10%, more preferably ±5% of a mean value. Having a controlled thickness for the fuel cell is advantageous since the current collectors on the cathode side of the fuel cell (which collect current from the cathode material) can be fabricated on the assumption of a particular distance between e.g. the interconnect of an adjacent fuel cell stack repeat layer or power take off plate/endpole.

Preferably, the anode, electrolyte and cathode layers of the at least one electrochemically active fuel cell stack repeat layer have a thickness of between 50 and 200 micron, more preferably 80-150 micron, more preferably 90-100 micron. Preferably, the anode layer has a thickness of about 20 microns, the electrolyte layer has a thickness of about 15 microns, and the cathode layer has a thickness of about 65 microns.

Preferably, the fuel cell stack oxidant inlet is open manifolded. Preferably, the exhaust oxidant outlet is internally manifolded.

Preferably, the fuel cell stack fuel inlet is internally manifolded. Preferably, the exhaust fuel outlet is internally manifolded.

Preferably, the metal substrate is formed from a sheet or foil. More preferably, the metal substrate is generally flat or planar, more preferably flat. This provides a significant technical advantage over e.g. products in which the substrate has features protruding from its surface—formation of the flat/planar metal substrate is a simple and straightforward process, simply requiring that e.g. a foil is cut to size and that a portion of it is perforated by e.g. laser drilling so as to define the metal substrate having a porous region surrounded by a non-porous region. In contrast, metal substrates having features protruding from them require complex multi-stage forming or stamping processes. For example, the forming of a protruding feature by stamping inevitably results in a thinning of metal to define the protrusion, in turn potentially resulting in weakening of the metal substrate at the protrusions and/or in the use of thicker metal substrate material in order to reduce the problems caused by stamping, with an increase in material costs and thermal mass of the end product and therefore impaired performance.

Preferably, the metal substrate of the electrochemically active fuel cell stack repeat layers includes a porous region surrounded by a non-porous region, the anode, electrolyte and cathode layers being deposited upon the porous region. Thus, fuel passing along the fuel flow path is able to pass through the porous region to the anode layer and is able to interact with the fuel cell anode and electrolyte layers. The reacted fuel gases are able to return through the porous region.

Preferably, the porous region comprises a plurality of perforations/through apertures extending between (i.e. defined between) opposite faces/surfaces (i.e. between first and second faces/surfaces) of the metal substrate.

In certain embodiments, the metal substrate of the electrochemically inactive fuel cell stack repeat layers does not include a porous region, more preferably does not include a porous region surrounded by a non-porous region.

Preferably, each fuel cell stack repeat layer optionally additionally comprises a metal spacer located between said metal substrate and said metal interconnect plate. The spacer may also be referred to as a manifolding layer or manifolding plate. As detailed in the specific embodiments below, a combination of a metal interconnect plate, a manifolding plate, and a metal substrate can define a void between them and together define a fuel flow path from a fuel inlet to an exhaust fuel outlet. Naturally, other arrangements will be readily apparent to one of ordinary skill in the art.

In certain embodiments, a fuel flow path is not defined in at least one electrochemically inactive fuel cell stack repeat layer from a fuel inlet to an exhaust fuel outlet. In such embodiments either there is no fuel inlet (or any fuel inlet is blocked), thus no fuel flow path defined in the void, or fuel flow may occur in the void from a fuel inlet but no fuel outlet (discrete from the fuel inlet) is defined or any fuel outlet is blocked.

The metal spacer defines a void between the metal substrate and the interconnect, whereby the poor thermal conductivity of gas in the void greatly reduces the thermal conductivity at this point, i.e. reduces the thermal conductivity across the electrochemically inactive fuel cell stack repeat layer and thus can be considered as providing a thermal break.

The thermal break can also be referred to as being a "thermal barrier", a "thermal buffer" or having "thermal buffering".

The blocking of fuel flow can be readily achieved by suitable modification to a fuel cell manifolding plate. Thus, at least one electrochemically inactive fuel cell stack repeat layer may comprise a metal spacer configured to block fuel flow from said fuel inlet to said exhaust fuel outlet. Other fuel cell stack repeat layer components (interconnect, substrate, and gaskets etc.) can be identical to those of an electrochemically active fuel cell stack repeat layer. Therefore, the manufacture of the electrochemically inactive fuel cell stack repeat layers can be readily achieved by simply changing a single component (a manifolding plate). Other steps such as laser drilling of the metal substrate and the depositing of anode, electrolyte and cathode layers upon the metal substrate can also be removed, resulting in a simple, convenient and low cost manufacturing process for a component which achieves a significant improvement in fuel cell stack assembly performance.

Preferably, at least one electrically insulating gasket is located between each fuel cell stack repeat layer and its adjacent fuel cell stack repeat layer or layers. Alternatively or additionally, preferably, each fuel cell stack repeat layer additionally comprises at least one electrically insulating gasket. Preferably, such an at least one electrically insulating gasket is mounted on the metal substrate remote from the metal interconnect plate, i.e. on an opposite side of the metal substrate to that facing the metal interconnect plate.

The gasket also provides gas sealing for the inlet and outlet side fuel gas and the outlet side air gas.

Thus, preferably the anode, electrolyte and cathode layers are mounted on a first face of the metal substrate, and the at least one electrically insulating gasket is mounted on the same side of the metal substrate.

Thus, preferably the anode, electrolyte and cathode layers are mounted on a first face of the metal substrate, and metal interconnect plate is mounted on or joined or otherwise attached (preferably fused, e.g. welded) to an opposite side of the metal substrate to that of the anode, electrolyte and cathode layers.

Alternatively or additionally, preferably each fuel cell stack repeat layer which has an at least one adjacent fuel cell stack repeat layer additionally comprises an electrically insulating gasket between it and the adjacent fuel cell stack repeat layer.

The oxidant flow path is typically formed between the substrate and a metal interconnect plate of an adjacent fuel cell stack repeat layer or where there is no adjacent fuel cell stack repeat layer an additional adjacent metal interconnect plate. The at least one electrically insulating gasket on the metal substrate or between the metal substrate of a first repeat layer and the metal interconnect plate of an adjacent repeat layer acts to separate them and thus define the void required for the oxidant flow path. Thus, the oxidant flow path is defined when components are joined, mated, abutted or placed together.

Each electrochemically inactive fuel cell stack repeat layer is designed such that it is incapable of performing an electrochemical function. Preferably, each electrochemically inactive fuel cell stack repeat layer comprises a metal substrate and a metal interconnect plate, and defines an oxidant flow path from an oxidant inlet to an exhaust oxidant outlet.

Preferably, at least one (for example, each) electrochemically inactive fuel cell stack repeat layer is formed such that a fuel flow path from a fuel inlet to an exhaust fuel outlet is not defined. For example, a feature in the electrochemically inactive fuel cell stack repeat layer may prevent (i.e. block) fuel flow from a fuel inlet to an exhaust fuel outlet.

Alternatively, at least one (for example, each) electrochemically inactive fuel cell stack repeat layer is formed such that an oxidant flow path from an oxidant inlet to an exhaust oxidant outlet is not defined. For example, a feature in the electrochemically inactive fuel cell stack repeat layer may prevent (i.e. block) oxidant flow from an oxidant inlet to an exhaust oxidant outlet.

Alternatively, at least one (for example, each) electrochemically inactive fuel cell stack repeat layer may define both an oxidant flow path from an oxidant inlet to an exhaust oxidant outlet and a fuel flow path from a fuel inlet to an exhaust fuel outlet, but may otherwise be electrochemically inactive. For example, an electrochemically inactive fuel cell stack repeat layer may include anode, electrolyte and cathode layers mounted upon the metal substrate but may not define a flow path for fuel to pass to the anode layer.

In certain embodiments, the metal substrate of at least one electrochemically inactive fuel cell stack repeat layer does not include a porous region. Alternatively or additionally, in certain embodiments, the metal substrate of at least one electrochemically inactive fuel cell stack repeat layer does not have anode, cathode and/or electrolyte layers mounted upon it.

The number of electrochemically inactive fuel cell stack repeat layers used is dependent on the thermal buffering required at the base plate and end plate ends of the at least one fuel cell stack. For example, for a 1 kW stack, experiments have confirmed that 2-4 such layers at each end of the at least one fuel cell stack provide a cost-effective outcome to minimising thermal gradient across the stack height. This is detailed further in the specific embodiments below.

Thus, preferably the fuel cell stack assembly comprises at least one, two, three, four, five or ten of the first electrochemically inactive fuel cell stack repeat layers. Preferably the fuel cell stack assembly comprises at least one, two, three, four, five or ten of the second electrochemically inactive fuel cell stack repeat layers.

More preferably, the fuel cell stack assembly comprises two, three or four of the first and second electrochemically inactive fuel cell stack repeat layers.

The number of electrochemically active fuel cell stack repeat layers used is dependent upon the required electrical power output. For example, for a fuel cell stack assembly with a 1 Kw power output, a fuel cell stack assembly of the present invention may comprise between 96 and 120 active fuel cell stack repeat layers depending on the active area and power density of each fuel cell, between 5-120 active fuel cell stack repeat layers, more typically 70-110 layers. For example, given a 10-15 W per active fuel cell layer, it may comprise at least 99, 100, 105, 110 or 115 electrochemically active fuel cell stack repeat layers. More preferably, it may comprise between 99 and 115 or between 100 and 110 electrochemically active fuel cell stack repeat layers. More preferably, it may comprise 99 electrochemically active fuel cell stack repeat layers.

Reference herein to fuel cell stack electrical power output is distinct from fuel cell system electrical power output, and does not include power consumed by the fuel cell system itself, e.g. for control means and blowers etc.

Preferably, the fuel cell stack additionally comprises first and second power take off plates (negative power take off plate and positive power take off plate), also referred to herein as endpoles. The negative power take off plate is also referred to as the "monopole", and the positive power take off plate as the "endpole".

Naturally, the endpoles are in electrical contact with the at least one electrochemically active fuel cell stack repeat layer.

The first power take off plate (i.e. first endpole) may be located at the fuel cell stack first end. It may be located between the fuel cell stack first end and the adjacent end (i.e. a first end) of the set of electrochemically active fuel cell stack repeat layers, i.e. between the fuel cell stack first end and the closest electrochemically active fuel cell stack repeat layer. Preferably, the first power take off plate is located at a first end of the set of electrochemically active fuel cell stack repeat layers.

The second power take off plate (i.e. second endpole) may be located at the fuel cell stack second end. It may be located between the fuel cell stack second end and the adjacent end (i.e. a second end) of the set of electrochemically active fuel cell stack repeat layers, i.e. between the fuel cell stack second end and the closest electrochemically active fuel cell stack repeat layer. Preferably, the second power take off plate is located at a second end of the set of electrochemically active fuel cell stack repeat layers.

Preferably, the first power take off plate (i.e. endpole) is located between the or a first set of electrochemically inactive fuel cell stack repeat layers (i.e. a first at least one electrochemically inactive fuel cell stack repeat layer) and the set of electrochemically active fuel cell stack repeat layers (i.e. the at least one electrochemically active fuel cell stack repeat layer), e.g. at a first end of the set of electrochemically active fuel cell stack repeat layers. Preferably, the second power take off plate is located between the or a second set of electrochemically inactive fuel cell stack repeat layers (i.e. a second at least one electrochemically inactive fuel cell stack repeat layer) and the set of electrochemically active fuel cell stack repeat layers, i.e. at a second end of the set of electrochemically active fuel cell stack repeat layers. Thus, the total electrical resistance of the electrical circuit is reduced since there is no need to pass electrical current through the first and second sets of electrochemically inactive fuel cell stack repeat layers. This arrangement is preferred as it eliminates power loss resulting from the stack current passing through the inactive cells.

Passing electrical current through one or more electrochemically inactive fuel cell stack repeat layers requires the electrical current to flow through the contact points between fuel cell stack repeat layers, and electrical resistance can be encountered particularly at e.g. oxide layers which form on metal contact surfaces.

Furthermore, taking power from the fuel cell stack arrangement at the base plate and the end plate (i.e. the end plates) presents a risk of failure or design resulting in the ends of the stack arrangement becoming electrically live. In a stack design where the end plates are metal and the hood surround is metal, any such failure or design would result in a direct electrical short. Locating endpoles within the stack layer design (i.e. within the at least one fuel cell stack):
  (i) improves the stack design against certain failure modes which could result in personal injury or system failure;
  (ii) allows use of an electrically conductive hood material (thus reducing cost compared to suitable electrically non-conductive hood materials); and
  (iii) reduces contact related electrical losses in the stack design.

Depending on the location of the endpoles, some or all of the inactive layer to inactive layer contacts do not need to be electrically conductive in order for the endpoles to be in electrical contact with the at least one electrochemically active fuel cell stack repeat layer. Thus, where a set of electrochemically inactive fuel cell stack repeat layers comprises a plurality of repeat layers, once power take off has occurred (i.e. an endpole has been reached in the direction from the at least one electrochemically active fuel cell stack repeat layer to the at least one electrochemically inactive fuel cell stack repeat layer), contact between inactive layers does not need to be electrically conductive.

Preferably, electrical connections are provided between the first and second power take off plates (i.e. endpoles) and an electrical power circuit external to the intermediate-temperature solid oxide fuel cell stack assembly so as to provide useful electrical work, e.g. to a load upon that circuit.

In certain embodiments, the first and second power take off plates (i.e. endpoles) comprise arms extending to the base plate and which mate with base plate members or features (for example, male or female members, sockets, orifices or recesses) so as to allow the electrical current generated by the fuel cell stack to be fed to the electrical power circuit. Naturally, with the base plate typically being metal (i.e. electrically conductive) and the first and second power take offs being electrically conductive, it is necessary to provide electrically insulating components either in the base plate or the first and second power take offs to avoid short-circuits to the baseplate and/or between the power take offs, and suitable components will be readily apparent to one of ordinary skill in the art.

Thus, preferably the intermediate-temperature solid oxide fuel cell stack assembly additionally comprises at least one of:
  (a) an endpole located at either one of or between said first at least one electrochemically inactive fuel cell stack repeat layer and said at least one electrochemically active fuel cell stack repeat layer; and
  (b) an endpole located at either one of or between said second at least one electrochemically inactive fuel cell stack repeat layer and said at least one electrochemically active fuel cell stack repeat layer.

The endpoles can take a number of physical forms. For example, in some embodiments they can be in the form of physical plates which are separate/distinct from the fuel cell stack repeat layers. In other embodiments, they can be electrical connectors to the fuel cell stack repeat layers, for example a limb such as an arm extending from a fuel cell stack repeat layer, e.g. from a repeat layer metal interconnect plate or metal substrate. Naturally, different forms of endpoles can be used as desired.

In certain embodiments, the power take off plates (i.e. endpoles) and/or electrical connections between them and an external circuit are configured such that a first power take off is through the base plate, and a second power take off is through the end plate. Electrical power feed-through features can be provided as necessary and appropriate in the relevant components e.g. in the base plate and end plate. Other arrangements/configurations for power take off will be readily apparent to one of ordinary skill in the art.

Thus, preferably the fuel cell stack assembly additionally comprises first and second endpoles (i.e. power take offs) in electrical contact with the at least one electrochemically active fuel cell stack repeat layer, and the base plate and end plate are electrically isolated from the at least one electrochemically active fuel cell stack repeat layer. Preferably, the endpoles are in physical contact with or extend from fuel cell stack repeat layers. Preferably, the endpoles are fused with fuel cell stack repeat layers.

Preferably, the at least one electrochemically inactive fuel cell stack repeat layer comprises an electrically conductive material mounted upon the metal substrate, preferably in a position corresponding to that of the anode-electrolyte-cathode structure mounted on the metal substrate of the at least one electrochemically active fuel cell stack repeat layer. This can also be described as being on the cathode side, or as being on the oxidant side i.e. in the fluid flow path between the oxidant inlet and the exhaust oxidant outlet.

Preferably, the electrically conductive material of the electrochemically inactive fuel cell stack repeat layer has a low thermal conductivity.

Preferably, the thickness of the electrically conductive material is the same as that of the anode, electrolyte and cathode layers of the electrochemically active fuel cell stack repeat layers. This means that the same current collectors can be used in the at last one electrochemically inactive fuel cell stack repeat layer as in the at least one electrochemically active fuel cell stack repeat layer. At the same time, the material provides thermal insulation across the electrochemically inactive fuel cell stack repeat layer, i.e. assists in thermal buffering/creating a thermal break.

This allows effective transmission of compressive force throughout the whole fuel cell stack (including the electrochemically inactive fuel cell stack repeat layers), such that effective electrical contact from electrochemically active fuel cell stack repeat layer to electrochemically active fuel cell stack repeat layer is achieved.

In certain embodiments of the electrochemically inactive fuel cell stack repeat layer where there is no porous region in the metal substrate, the electrically conductive material of the at least one electrochemically inactive fuel cell stack repeat layer is a cathode material. The cathode material is preferably the same cathode material as used in the electrochemically active fuel cell repeat layer, and more preferably is the same bulk cathode material as used in the electrochemically active fuel cell repeat layer.

In alternative embodiments, the electrically conductive material of the at least one electrochemically inactive fuel cell stack repeat layers is the anode, electrolyte and cathode layers.

As previously discussed, where the at least one electrochemically inactive fuel cell stack repeat layer comprises a fuel cell metal substrate which is porous, it may further comprise said electrically conductive material on the electrochemically active fuel cell stack repeat layers side having a low thermal conductivity, and a thickness equal to that of the anode, electrolyte and cathode layers of said electrochemically active fuel cell stack repeat layers.

Preferably, the metal components of a fuel cell stack repeat layer which are in electrical contact with one another are fused together, e.g. welded. For example, a metal interconnect plate and metal substrate of fuel cell stack repeat layers may be fused together, or a metal interconnect plate, metal spacer, and metal substrate may be fused together. Thus, surface-to-surface contact resistance losses between them do not occur, electron flow between them primarily being via the fuse/weld path.

Preferably, said at least one intermediate-temperature solid oxide fuel cell stack is a planar fuel cell stack.

Preferably, the fuel cell stack assembly additionally comprises a hood arrangement enclosing the at least one intermediate-temperature solid oxide fuel cell stack. Thus, preferably said intermediate-temperature solid oxide fuel cell stack assembly additionally comprises a hood defining a hood volume containing said at least one intermediate-temperature solid oxide fuel cell stack. Hood arrangements are taught in e.g. WO2008/104760. Preferably, a hood volume is defined between the base plate, end plate and hood.

Preferably, the hood is sealingly attached to the base plate and defines said hood volume between the base plate and the hood. Preferably, the hood is additionally sealingly attached to the end plate and defines the hood volume between the base plate, end plate and hood.

Preferably, the base plate and/or end plate are provided with a feature such as a protrusion or skirt extending around the circumference thereof against which the hood can be secured, mounted or abutted and a gas seal between the hood and the base plate and between the hood and the end plate achieved (for example with a gas seal weld).

Preferably, the hood is electrically conductive. More preferably, the hood is a metal hood. This is particularly useful since it allows for the simple and convenient attachment of the base plate to the hood by known metal joining and sealing techniques, including welding. This emphasises the advantage of having the base plate electrically isolated from the at least one fuel cell stack as detailed above—if it were not electrically isolated from the at least one fuel cell stack then it would not be possible to use a metal hood since it would be in electrical contact with the (live) at least one fuel cell stack and would pose a significant safety risk due to its large exposed surface area and risk of being contacted by people and of contacting and shorting other components. Even in the design case where either the baseplate or the endplate were electrically live, then any electrically conductive component contacting the live part would itself become live. By electrically insulating the active fuel cell stack repeat layers from the base plate, end plate and hood, it both protects any person carrying our repairs or maintenance on or around an operating fuel cell stack as well as providing simple component earthing in a product.

Preferably, the base plate and the hood are arranged to minimise the surface area and volume of the base plate which is within the hood volume, and thus minimise the opportunity for heat transfer between fluids in the hood volume and the base plate. Preferably, primarily only an upper surface of the base plate is within the hood volume. Preferably the side walls of the base plate are not within the hood volume, and fluid flow (i.e. gas flow) within the hood volume does not extend to the side walls. If fluid flow to the side walls of the base plate is not wholly prevented then preferably it is limited or otherwise restricted, for example by proximity of the hood to the side walls of the base plate.

For example, a gas seal weld can be made between the hood and the base plate where the hood abuts a protrusion or skirt etc. of the base plate. Such a skirt or protrusion may be at a lower portion of the base plate, i.e. away from an upper surface upon which the at least one fuel cell stack is mounted. With the hood covering and extending along the side wall of the base plate, an additional gas seal weld may be made between the base plate and the hood towards the upper surface of the base plate so as to prevent gas flow between the side wall of the base plate and the hood. Alternatively, it may be that a friction fit between the base plate and hood is considered to be sufficient to prevent or minimise gas flow between the base plate side wall and the hood.

The same arrangement may be effected with the end plate to minimise the surface area and volume of the base plate which is within the hood volume, and thus minimise the opportunity for heat transfer between fluids in the hood volume and the base plate.

The result of this is that the whole of the base plate and end plate do not therefore "see" the operating temperature in the hood volume, and the base plate and end plate are in a generally cooler environment. This can help assist fuel cell stack performance, at all stages, including at steady state, start-up and shut-down.

In particular, this reduction in operating temperature of parts of the base plate and end plate can be particularly useful for the clamping means. Where, for example, the clamping means comprises tiebars attached to the base plate and end plate, the tie bars only need to be mounted to the base plate and end plate. Therefore, the mounting means, such as for instance screw threads, do not see the higher operating temperature of the hood volume, and therefore operate in a cooler environment. This cooler environment can for example be at a temperature below the yield point of the tiebar material. The tiebars can be designed to operate in a thermo-mechanical way at the same expansion and contraction rate as the at least one fuel cell stack in the stacking direction, thus maintaining tiebar tension, and hence compression of the at least one fuel cell stack, over the operating range of the intermediate-temperature solid oxide fuel cell stack assembly.

In operation, each fuel cell stack repeat layer produces electrical current flow as well as thermal heat. As mentioned herein, the environmental temperature affects the power production of the cell, and the end repeat layer active cells tend to see a lower environmental temperature than those repeat layer cells in the middle of the stack.

As detailed above, the electrochemically inactive fuel cell stack layers are adapted to allow for a fluid flow of oxidant (e.g. air) and/or fuel across these inactive repeat layers, thus providing a source of thermal energy. By doing this, these electro-inactive repeat layers act as a thermal buffer (i.e. a thermal break) at the end of the active layers.

Preferably, at start-up, inlet oxidant (air) and/or fuel passes through a pre-heater prior to entering the fuel cell stack assembly, and this results in heated air and/or fuel passing along the fluid flow path(s) across the inactive fuel cell stack repeat layers, in turn resulting in them being heated and providing thermal buffering at the end of the electrochemically active layers.

Thus, preferably the intermediate-temperature solid oxide fuel cell stack assembly additionally comprises a pre-heater. Similarly, an at least one heat exchanger can be provided to effect heating of inlet oxidant, and this heating can be effected at any stage of operation e.g. start-up, steady-state and/or shut-down. Suitable pre-heaters, heat exchangers, burners, tail-gas burners, combustors and arrangements are well known in the art and taught in e.g. WO2008/104760.

Thus, for example, the assembly can additionally comprise at least one heat exchanger adapted or arranged to exchange heat between an exhaust gas flow and an inlet gas flow. An exhaust gas flow may be e.g. an exhaust oxidant flow, an exhaust fuel flow, or a burner or combustor exhaust flow e.g. a tail gas burner exhaust flow. Thus, an at least one heat exchanger may be located or positioned between an oxidant or fuel inlet and an exhaust outlet e.g. an oxidant exhaust outlet, a fuel exhaust outlet, or a burner exhaust outlet.

During start-up, the electrochemically inactive fuel cell stack repeat layers separate the mode dynamic heating capacity of the metal supported cells from the larger thermal mass of the end plate, thus allowing for a faster start-up. Thus, providing the electrochemically inactive layers between the electrochemically active layers and the base plate/end plate acts to thermally decouple them, i.e. the large thermal mass of the baseplate and endplate and their corresponding higher thermal inertia is decoupled from the low thermal mass fuel cells and electrochemically active repeat layers. This is particularly the case where an additional heat source is provided in the form of heat from a pre-heater. Thus, not only is heat loss reduced from the electrochemically active repeat layers adjacent or proximal the at least one electrochemically inactive fuel repeat layer, but a heated inlet flow of oxidant or fuel can additionally effect heating of the at least one electrochemically inactive repeat layer and thus effect heating of electrochemically active repeat layers which are adjacent or proximal.

Reducing the time lag effect of the base plate and end plate thermal masses allows the electrochemically active cell temperatures to more rapidly get above the level required to allow fuel cell operation without fuel cell material damage or the risk of carbon deposition or related carbon interactions. This can be beneficial for instances where more rapid start-up is required or where significant stepped increases in power is required. The same de-coupling effect can aid shut-down, where the temperature of the active fuel cell layers may be required to be below a certain temperature to prevent cell damage.

The electrochemically inactive fuel cell stack repeat layers also reduce the end of stack cooling effect during start-up and dynamic operation, reducing the operating environment temperature difference between the active repeat layers at the centre of the stack and those at the end of the stack. A drop in operating temperature of an active fuel cell repeat layer can impact on operating performance for that cell, which can be measured as a reduction in the operating voltage of the active repeat layers. As detailed in the experiments below, without the dummy layers (electrochemically inactive fuel cell stack repeat layers) the difference can be as much as 345 mV, yet with the dummy layers, this can reduce to less than 75 mV.

The experimental data below is obtained with comparative fuel cell stacks containing 99 electrochemically active fuel cell stack repeat layers—one stack without electrochemically inactive repeat layers and one stack with 3 electrochemically inactive repeat layers at each end of the active stack. For the same nominal steady state operating point at 0.5 kW output, the stack with the electrochemically inactive repeat layers showed (compared to the stack without the electrochemically inactive repeat layers) the mean stack voltage increased by 6% with a significant reduction of cell voltage standard deviation from 70 to 8 mV and cell voltage difference reduced from 345 to 71 mV.

As is detailed in the specific embodiments below, the fuel cell stack assembly of the present invention can achieve an increase in mean voltage of electrochemically active fuel cell stack repeat layers, an increased maximum voltage, a significantly increased minimum voltage, and a decreased standard deviation.

Preferably, the fuel cell stack assembly comprises at least one electrically insulating (i.e. a non-electrically conductive) gasket located between the base plate and the first end of the at least one fuel cell stack. Preferably, the fuel cell stack assembly comprises at least one electrically insulating gasket located between the second end of the at least one fuel cell stack and the end plate.

Preferably, the at least one electrically insulating gasket is also thermally insulating. Preferably, the at least one electrically insulating gasket is also a gas seal gasket. Thus, preferably the at least one electrically insulating gasket is an electrically and thermally insulating gas seal gasket.

Preferably, the electrically insulating gasket is chemically stable, has low or negligible creep at stack operating temperatures (more particularly in the temperature range 450-650 Deg C.), and is thermally insulating, and is compliant and provides a limited tolerance for variation in fuel cell stack component part dimensions.

In certain embodiments the fuel cell stack assembly comprises at least two, three, four or five electrically insulating gaskets located between the base plate and the first end of the at least one fuel cell stack.

In certain embodiments the fuel cell stack assembly comprises at least two, three, four or five electrically insulating gasket located between the second end of the at least one fuel cell stack and the end plate.

Suitable materials for the electrically insulating gaskets include vermiculite and mica, preferably mica. Suppliers include Flexitallic (www.flexitallic.com; Flexitallic Ltd., UK) and Garlock (www.garlock.com; .EnPro Industries, Inc., NC, USA).

Preferably, the end plate has a flat surface on the side facing the base plate (i.e. facing towards the fuel cell stack repeat layers). Preferably, the end plate is adapted so as to provide a secure, stiff end to the compression means.

In certain embodiments, multiple fuel cell stacks each having an end plate are mounted upon the base plate. In certain embodiments, multiple fuel cell stacks having a shared end plate are mounted upon the base plate. In certain embodiments, a mixture of such multiple fuel cell stacks and end plates is provided.

Preferably, the IT-SOFC stack assembly additionally comprises electrical connectors and an electrical load between the at least one fuel cell stack first end and the at least one fuel cell stack first end second end, defining an electrical circuit. For example, the electrical connectors and electrical load may be between the power take offs (end-poles).

Preferably, the fuel cell stack assembly additionally comprises at least one of: a fuel side seal assembly, oxidant side seal assembly, fuel cell stack insulation, and electrical and control/monitoring connections.

The term "fuel cell stack system assembly" as used herein means a fuel cell stack assembly together with system electronics. Other optional components include a reformer (if inlet fuel is to be reformed), a water recovery system, a steam generator unit, an at least one heat exchanger optionally involving the phase change of one of the heat exchanger streams, system electronics and system control means, thermal insulation, a start-up burner, a tail-gas combustor, and a combined start-up and tail-gas burner. An optional component includes a combined start-up and off-gas burner. Other optional components include: an at least one oxidant blower, an at least one fuel blower, an oxidant preheater, and a fuel preheater.

Preferably, the fuel cell stack assembly, more particularly the at least one intermediate-temperature solid oxide fuel cell stack, is thermally insulated from any adjacent reformer, cell stack, burner or combustor, e.g. start-up burner or tail-gas combustor. There will, of course, be heat transfer from such components by way of flow of fluid (gas) heated by such components. However, the fuel cell stack assembly, more particularly the at least one intermediate-temperature solid oxide fuel cell stack, can be thermally insulated to reduce direct heat transfer from them.

Thus, also provided according to the present invention is a fuel cell stack system assembly, comprising an intermediate-temperature solid oxide fuel cell stack assembly according to the present invention.

Alternatively, the intermediate-temperature solid oxide fuel cell stack assembly of the present invention of the present invention may additionally comprise at least one of the above fuel cell stack system assembly components.

Also provided according to the present invention is a method of operating an intermediate-temperature solid oxide fuel cell stack assembly according to the present invention, the method comprising the steps of:
(a) feeding fuel and oxidant to respective fuel and oxidant inlets to said intermediate-temperature solid oxide fuel cell stack assembly; and
(b) operating said intermediate-temperature solid oxide fuel cell stack assembly to oxidise said fuel with said oxidant and generate electricity.

Preferably, said oxidant is heated. More preferably, said oxidant is heated at start-up by a start-up burner, pre-heater or combustor.

Definitions:

The term "system electronics" includes the control electronics and/or any power electronics, where there can be at least one electronics board and/or unit optionally placed together or apart, in or close to the fuel cell stack assembly.

The term "system control means" includes the gas and fluid control valves and pumps, air blower unit, and safety equipment.

Unless the context dictates otherwise, the words "comprise", "comprises", "comprising" and the like are to be interpreted in an inclusive, rather than exhaustive sense i.e. the sense of "including, but not limited to". The terms do include embodiments in which no further components are present.

The "exhaust oxidant outlet" and the oxidant flowing through it can also be referred to as a "cathode off-gas". Similarly, the "exhaust fuel outlet" and the exhaust fuel flowing through it can be referred to as an "anode off-gas".

Particular and preferred aspects of the invention are set out in the accompanying independent claims. Combinations of features from the dependent claims may be combined with features of the independent claims as desired and appropriate and not merely as explicitly set out in the claims.

An enabling disclosure of the present invention, including the best mode thereof, to one of ordinary skill in the art, is set forth more particularly in the remainder of the specification. Reference now will be made in detail to the embodiments of the invention, one or more examples of which are set forth below. Each example is provided by way of explanation of the invention, not limitation of the invention. Of the figures.

Figure 1:
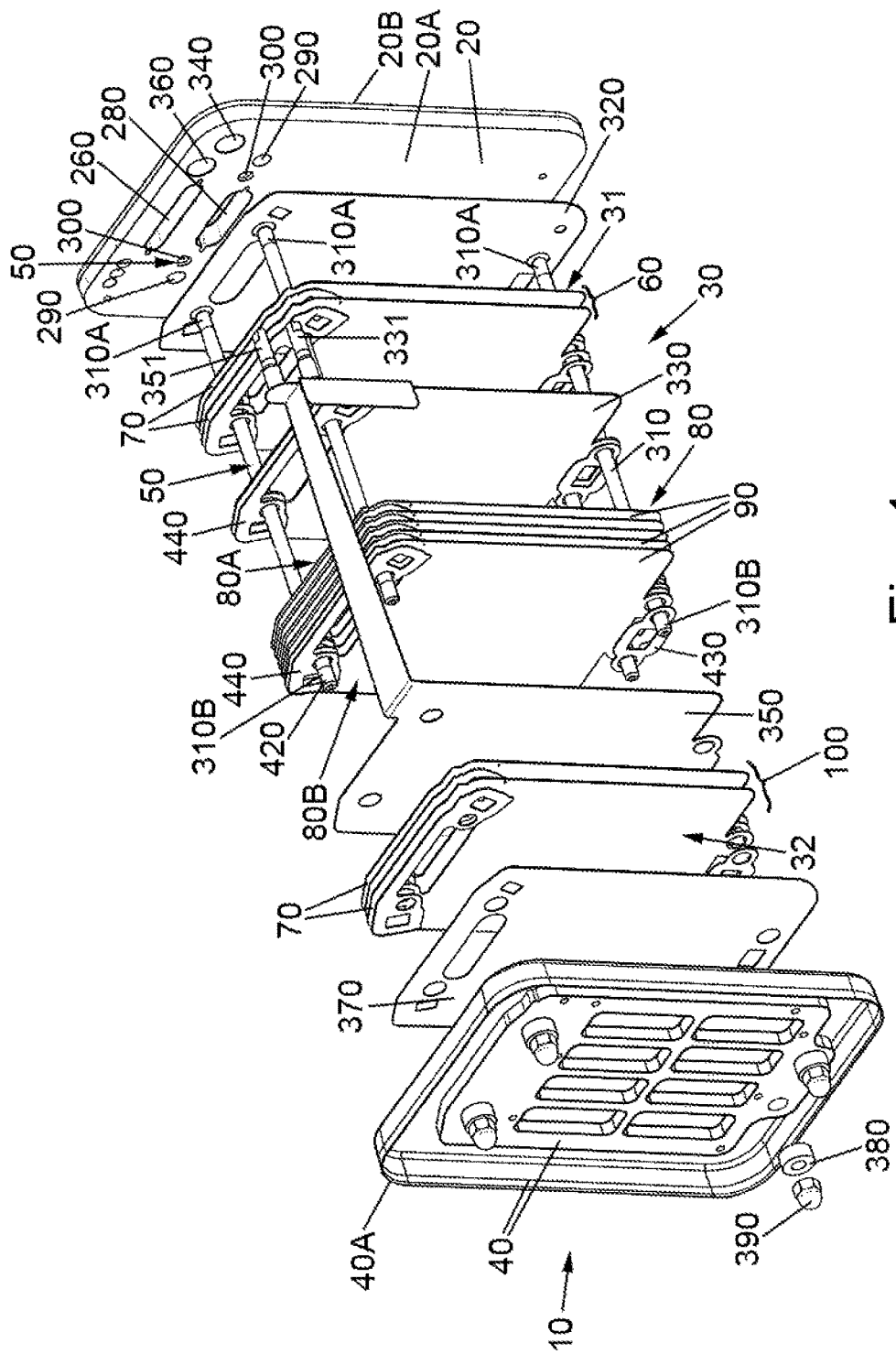
FIG. 1 shows an exploded view of a fuel cell stack assembly.
Figure 2:
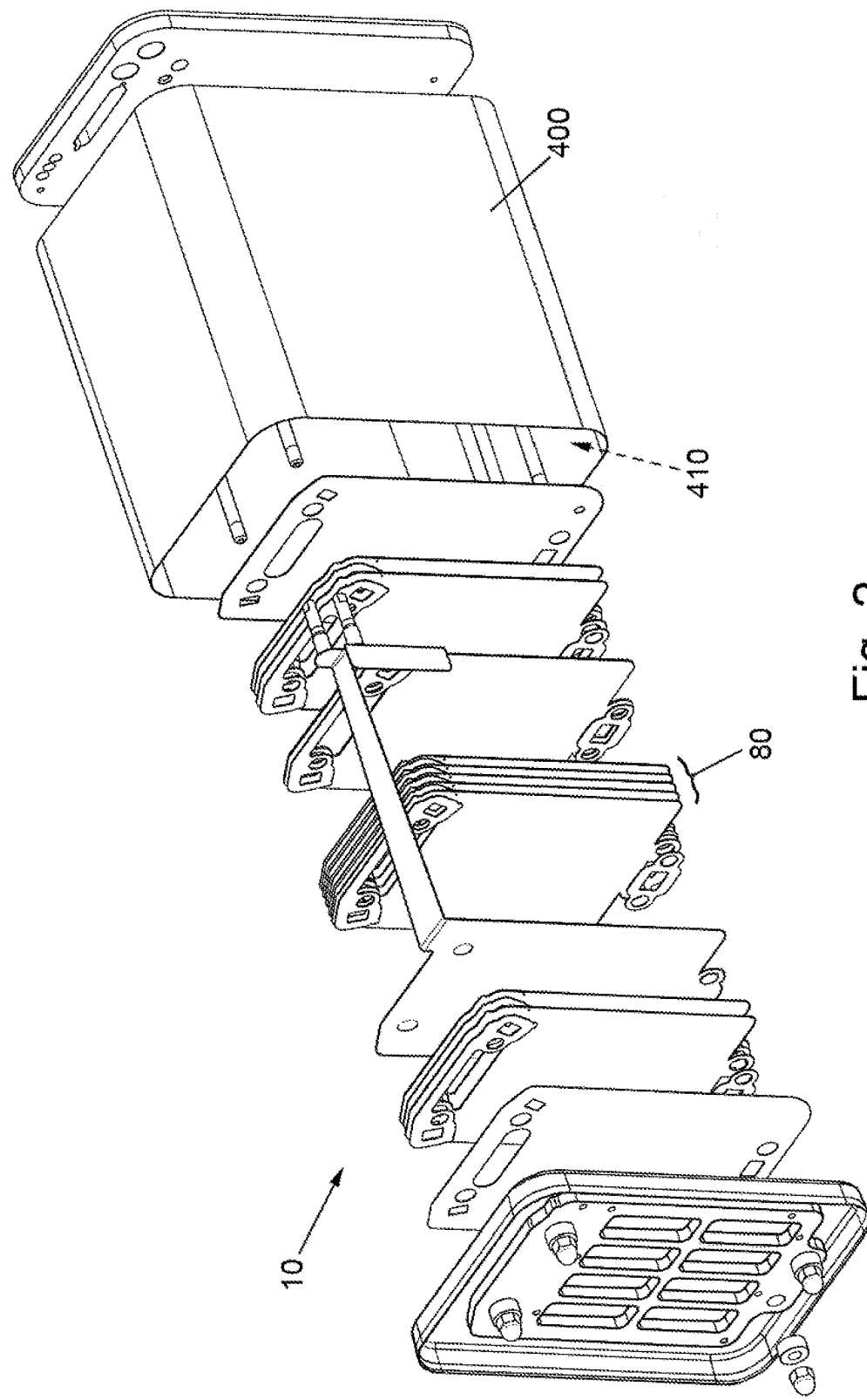
FIG. 2 shows an exploded view fuel cell stack assembly of FIG. 1 together with its hood.
Figure 4:
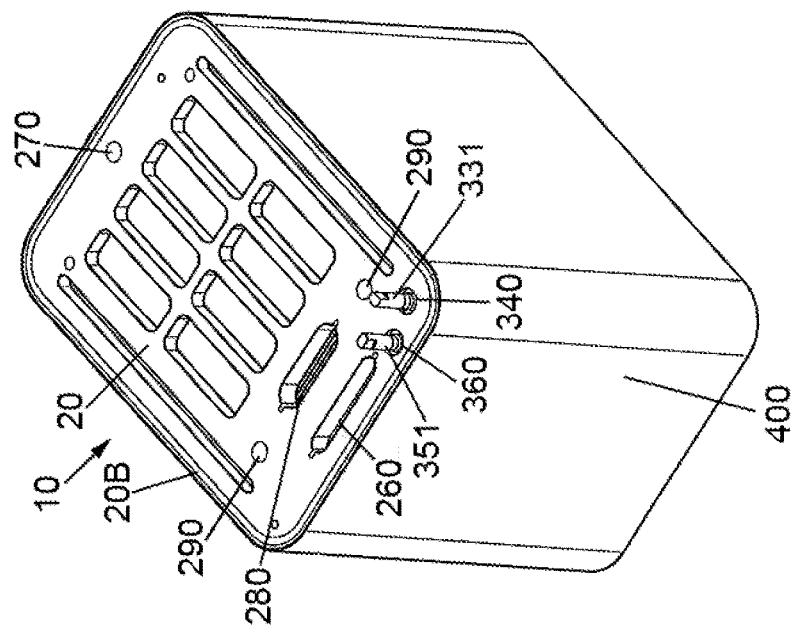
FIG. 4 shows a bottom isometric view of the fuel cell stack assembly of FIG. 2.
Figure 3:
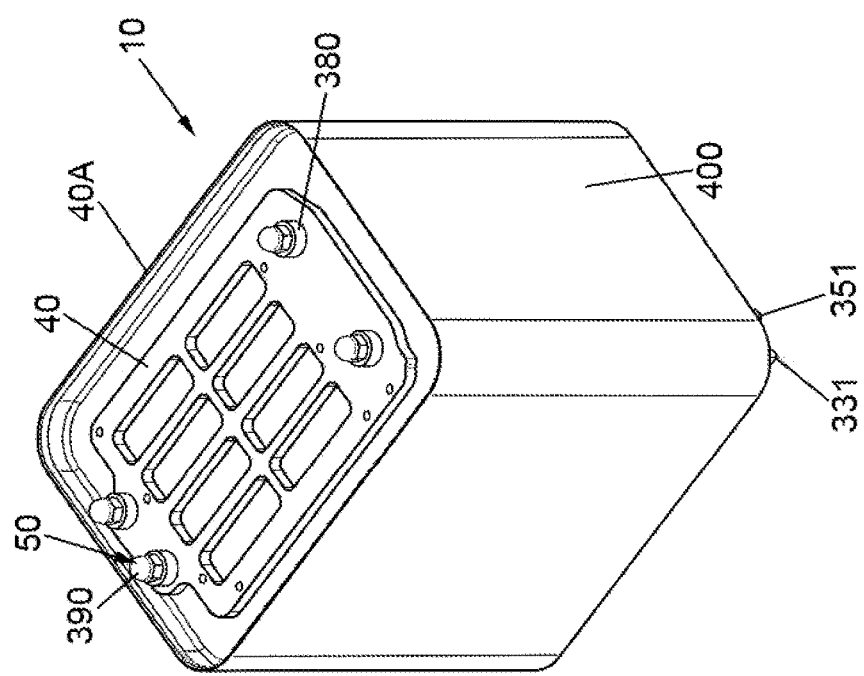
FIG. 3 shows a top isometric view of the fuel cell stack assembly of FIG. 2.
Figure 5:
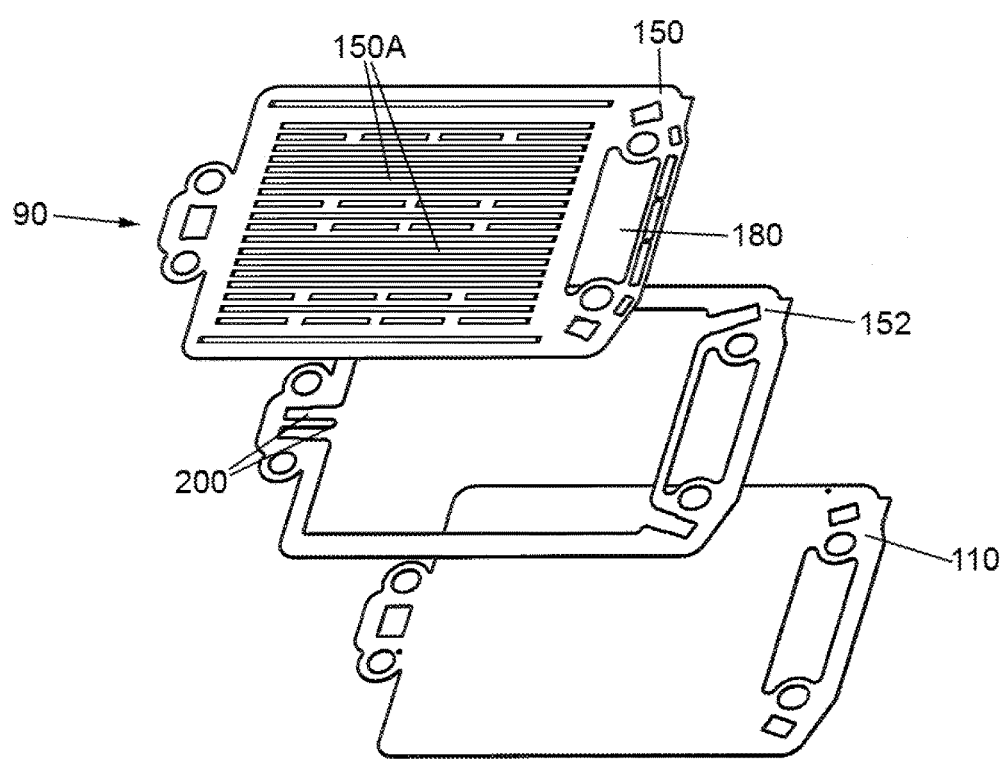
FIG. 5 shows an exploded view of an electrochemically active fuel cell stack repeat layer.
Figure 6:
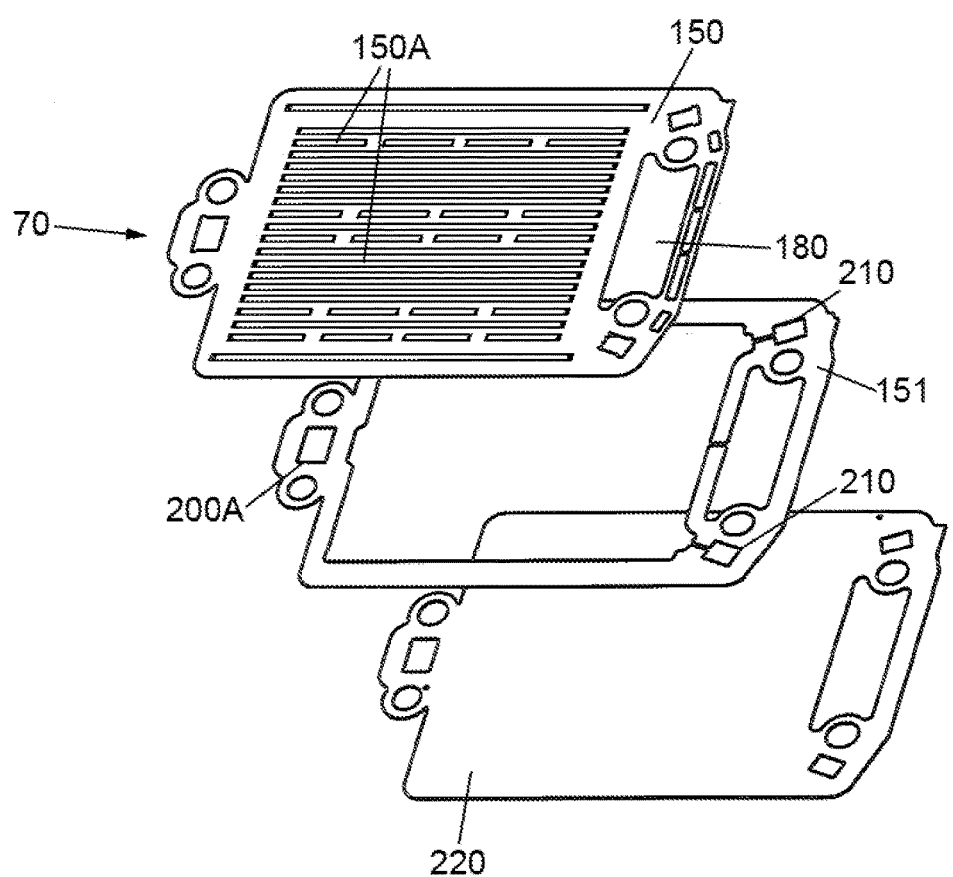
FIG. 6 shows an exploded view of an electrochemically inactive fuel cell stack repeat layer.
Figure 8:
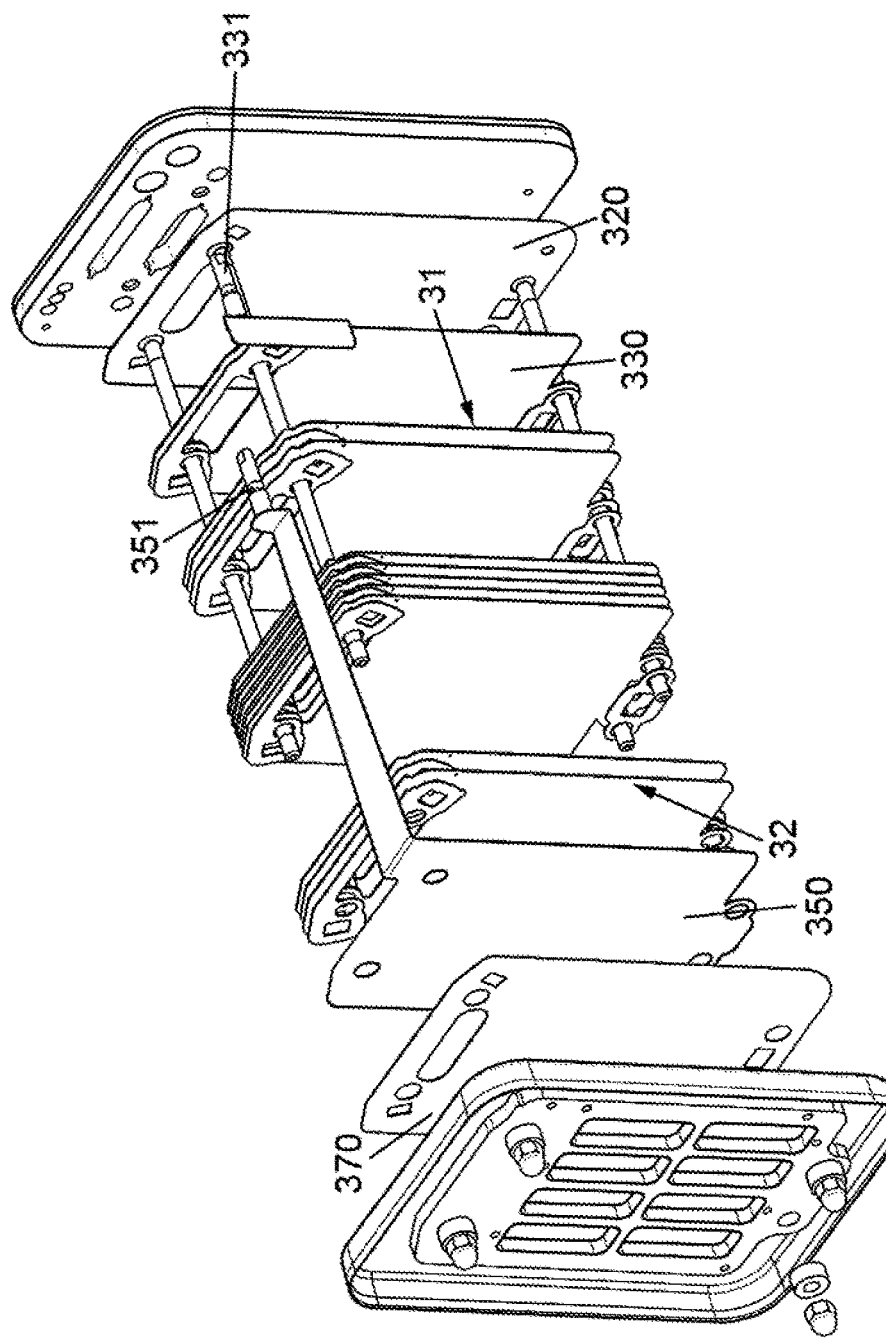
FIG. 8 shows an exploded view of a fuel cell stack assembly of Embodiment 3.
Figure 9:
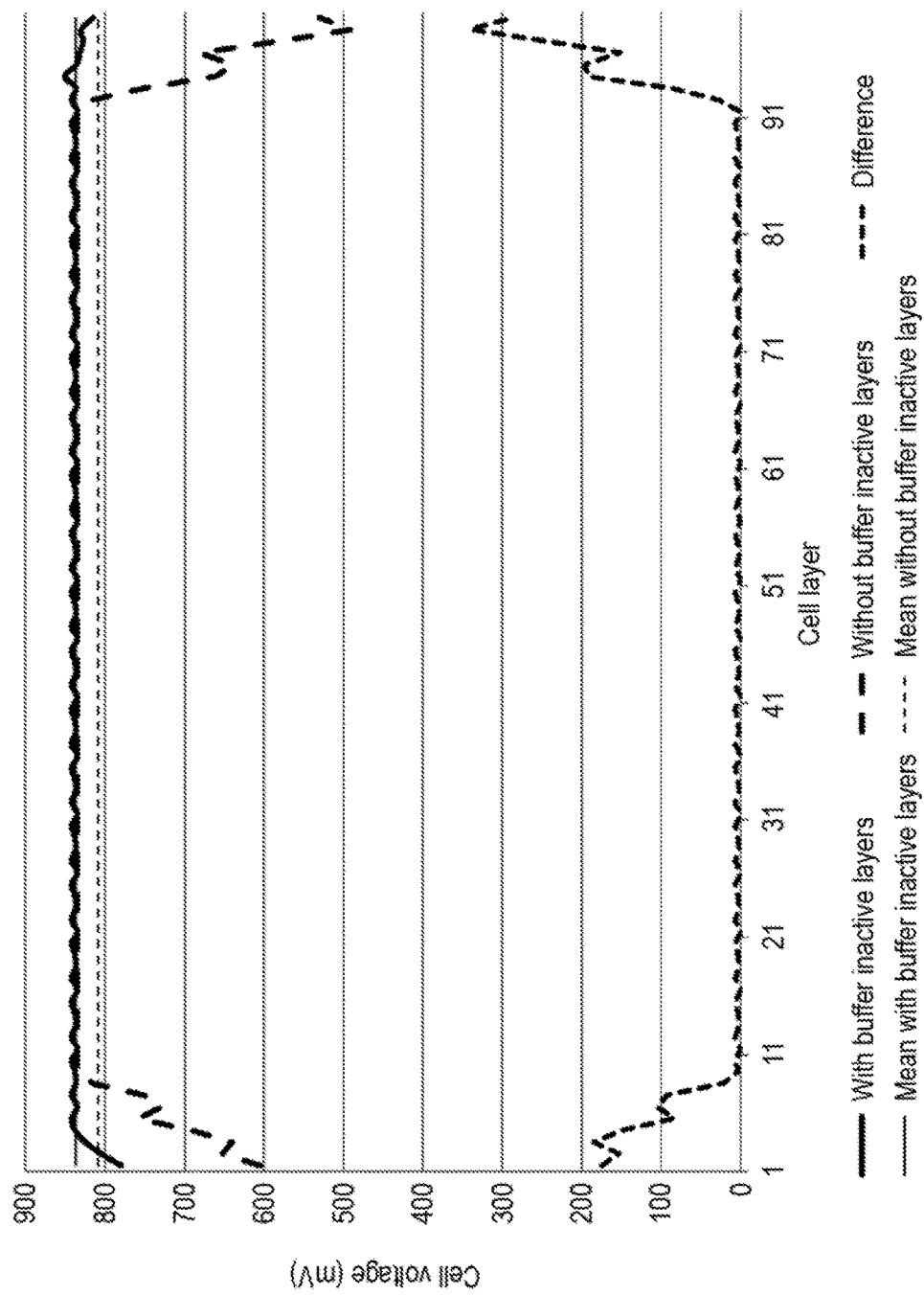
Figure 10:
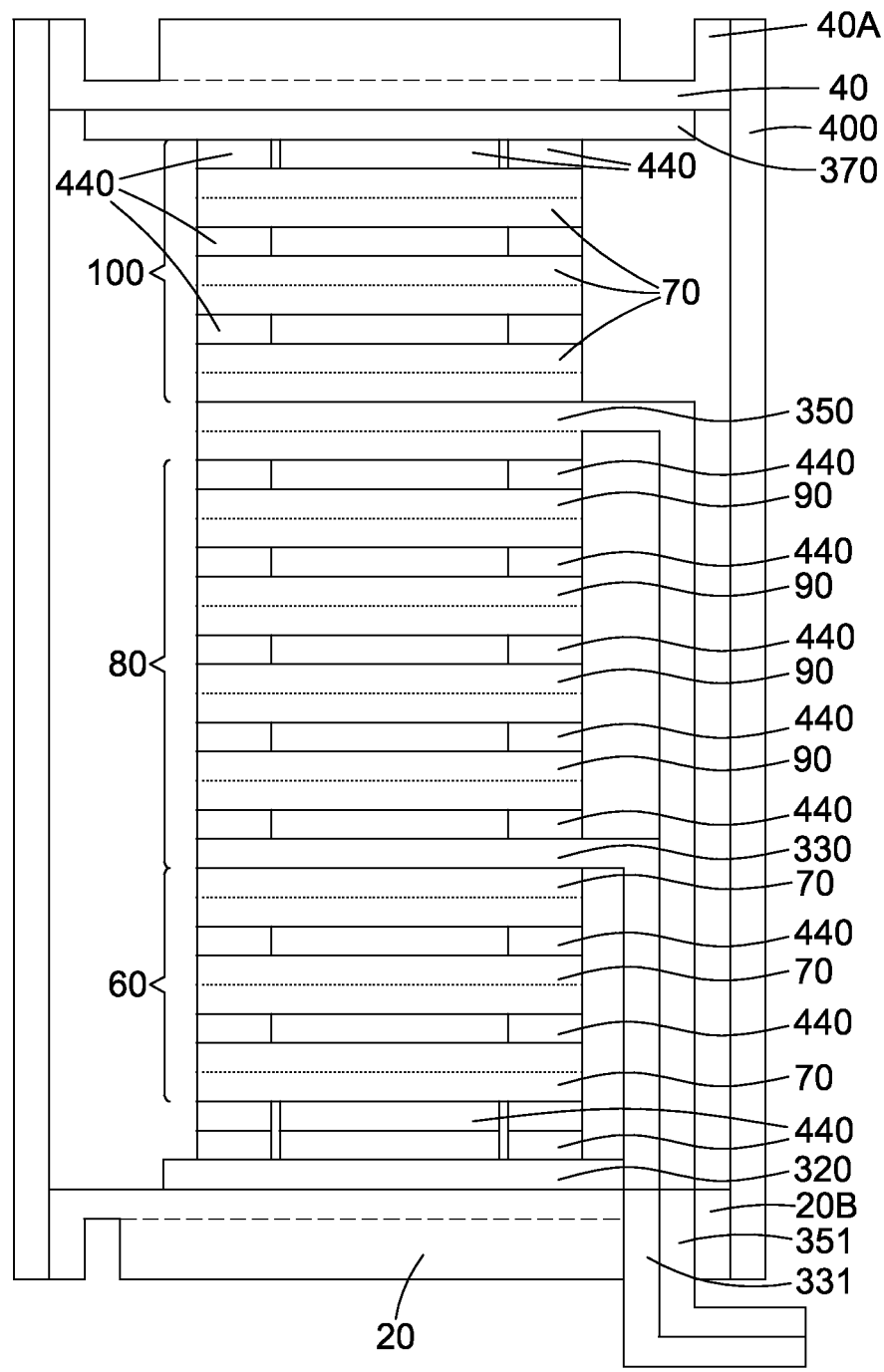
Figure 11:
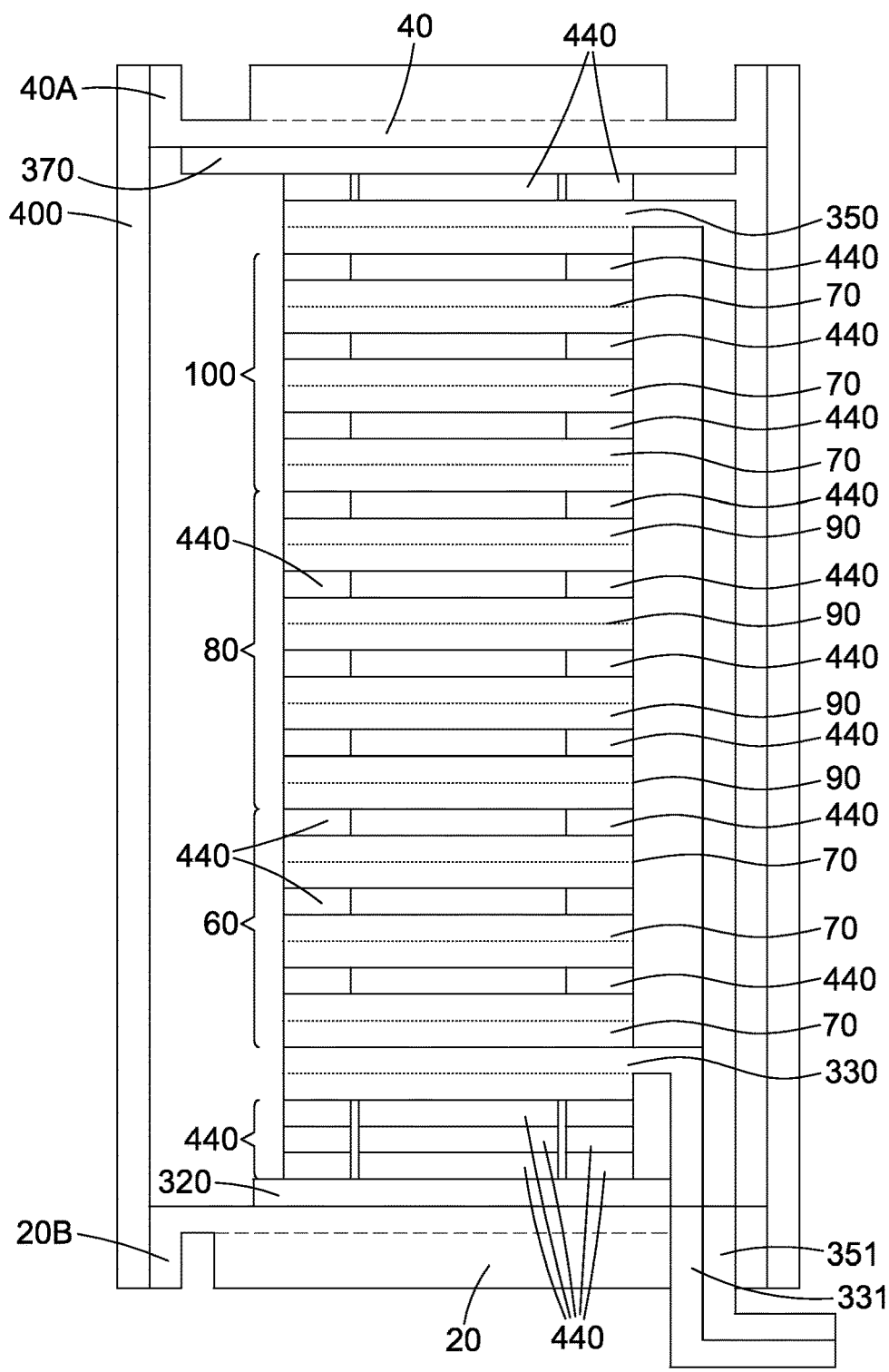

FIG. 9 shows a comparison of cell voltages in a 99 layer stack (A) with 3 electrochemically inactive "buffer" repeat layers at the top and bottom of the electrochemically active repeat layers in the fuel cell stack, and (B) without any electrochemically inactive "buffer" repeat layers at the top or bottom of the electrochemically active repeat layers in the fuel cell stack. X-axis shows cell layer, and Y-axis shows cell voltage (mV). Thick solid black line (starting at about 790 mV) is "With buffer inactive layers". Thick black dashed line (starting at about 600 mV) is "Without buffer inactive layers". Black dashed line (starting at about 180 mV) is "Difference". Thin solid black line (starting at about 840 mV) is "Mean with buffer inactive layers". Thin dashed black line (starting at about 810 mV) is "Mean without buffer inactive layers";

FIG. 10 shows an illustrative cross sectional view of an intermediate temperature solid oxide fuel cell stack assembly of Embodiment 1 and FIG. 1;

FIG. 11 shows an illustrative cross sectional view of an intermediate temperature solid oxide fuel cell stack assembly of Embodiment 3 and FIG. 8

Figure 12:
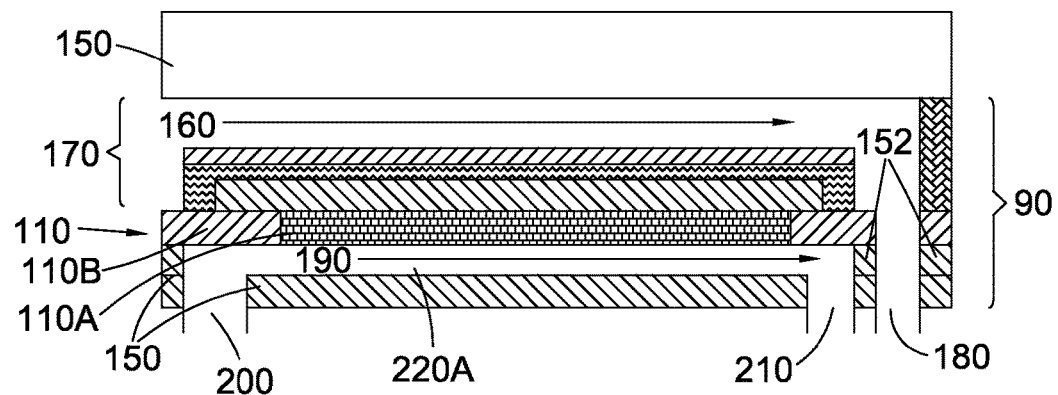
Figure 13:
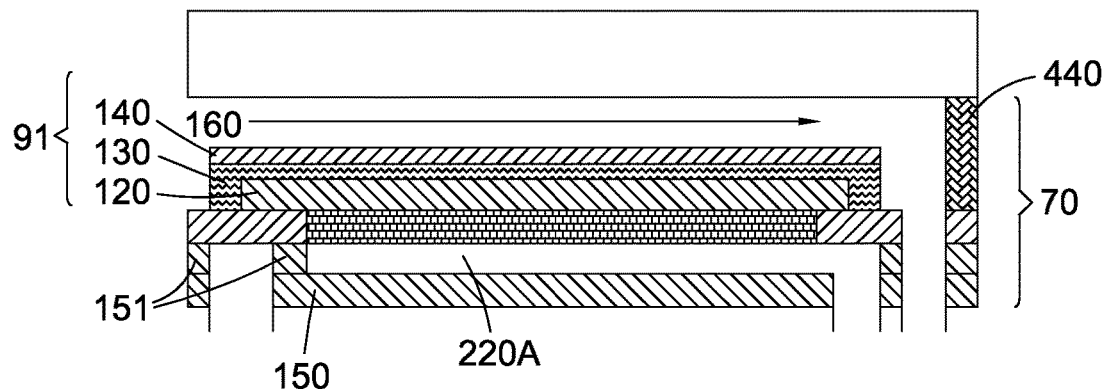
Figure 14:
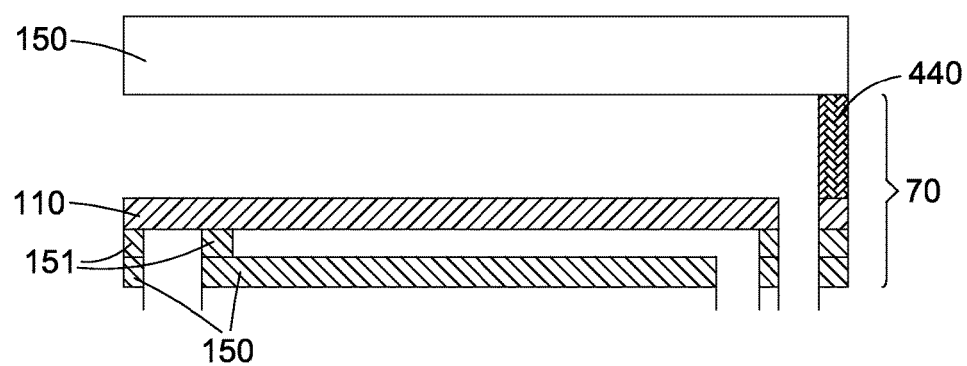

FIG. 12 shows an illustrative cross sectional view of an electrochemically active fuel cell stack repeat layer;

FIG. 13 shows an illustrative cross sectional view of an electrochemically inactive fuel cell stack repeat layer; and FIG. 14 shows an illustrative cross sectional view of an electrochemically inactive fuel cell stack repeat layer.

A list of the reference signs used herein is given at the end of the specific embodiments. Repeat use of reference symbols in the present specification and drawings is intended to represent the same or analogous features or elements.

It will be apparent to those of ordinary skill in the art that various modifications and variations can be made in the present invention without departing from the scope of the invention. For instance, features described as part of one embodiment can be used on another embodiment to yield a still further embodiment. Thus, it is intended that the present invention cover such modifications and variations as come within the scope of the appended claims and their equivalents.

For illustrative purposes only, the figures may only indicate a single fuel cell or a single fuel cell stack repeat layer. In various embodiments (not shown), multiple fuel cells are provided. In various embodiments (not shown), multiple fuel cell stack repeat layers are provided. In further embodiments (not shown), multiple fuel cell stacks are provided, and in still further embodiments multiple fuel cell stacks each comprising multiple fuel cells are provided. It will be appreciated that the anode and cathode inlets, outlets (off-gas), ducting, manifolding, and temperature sensors and their configuration are modified as appropriate for such embodiments, and will be readily apparent to a person of ordinary skill in the art.

In the following embodiments, air is used as the oxidant. Any reference to "oxidant" elsewhere can therefore be construed as reference to "air" in the following embodiments, and vice versa.

EMBODIMENT 1

This embodiment makes use of a modified compression system based on WO20007/085863, and a modified hood arrangement and fuel cell and manifolding arrangement based on WO2008/104760. Pre-heater/start-up burner and heat exchangers are generally as taught in WO2008/104760.

As shown in FIG. 1, intermediate-temperature solid oxide fuel cell stack assembly 10 comprising:
(i) a base plate 20;
(ii) an intermediate-temperature solid oxide fuel cell stack 30 mounted upon base plate 20;
(iii) an end plate 40; and
(iv) clamping means 50 adapted to exert compressive force upon fuel cell stack 30 between base plate 20 and end plate 40.

Base plate 20 and end plate 40 are made from stainless steel 3CR12.

Fuel cell stack 30 has first and second ends 31, 32, and is arranged mounted between base plate 20 and end plate 40, and comprises arranged in a direction from base plate 200 to end plate 40:
(a) first set 60 of 3 electrochemically inactive fuel cell stack repeat layers 70;
(b) set 80 of electrochemically active fuel cell stack repeat layers 90; and
(c) second set 100 of 3 electrochemically inactive fuel cell stack repeat layers 70.

Each electrochemically active fuel cell stack repeat layer 90 comprises one fuel cell 91 (in other embodiments, not shown, each electrochemically active fuel cell stack repeat layer 90 contains a plurality of fuel cells 91). Each fuel cell 91 comprises an anode 120, electrolyte 130 and cathode 140 mounted upon metal substrate 110, and covering a metal substrate porous region 110A which is surrounded by a metal substrate non-porous region 110B. Metal substrate 110 is mounted upon electrically conductive metal interconnect plate 150, and provides manifolding for fuel flow.

Each fuel cell stack repeat layer 70, 90 also includes electrically insulating gas seal gaskets 430, 440.

The metal substrate 110 of a first fuel cell stack repeat layer 90 or 70 is prevented from coming into direct electrical contact with an adjacent metal interconnect plate 150 (for example, of a second adjacent fuel cell stack repeat layer 90 or 70) by electrically insulating gaskets 430, 440. An oxidant flow path 160 is defined between the metal substrate 110 of each first fuel cell stack repeat layer 90, 70 and the adjacent metal interconnect plate 150 (for example, of a second adjacent fuel cell stack repeat layer 90 or 70), and passes from an open manifolded oxidant inlet 170 to an internally manifolded exhaust oxidant outlet 180.

A fuel flow path 190 is defined between metal substrate 110 and metal interconnect plate 150 from an internally manifolded fuel inlet 200 to an internally manifolded exhaust fuel outlet 210.

Each electrochemically inactive fuel cell stack repeat layer 70 is adapted such that it is incapable of performing an electrochemical function, and comprises a metal substrate 220 and a metal interconnect plate 150, and defines an oxidant flow path 160 from an oxidant inlet 170 to an exhaust oxidant outlet 180.

Base plate 20 incorporates oxidant inlet 260, fuel inlet, exhaust oxidant outlet 280 and exhaust fuel outlet 290. Base plate 20 also incorporates a set of four threaded recesses 300 which are adapted to receive the threaded ends 310A, 310B (threading not shown) of tiebars 310.

Tiebars 310 are fabricated from Hastelloy® C-276 (Haynes International, Inc., www.haynesintl.com), and have an electrically insulating coating to prevent short-circuiting. Other suitable materials for tiebars 310 include Inconel® alloy 718 (Special Metals Corporation; www.specialmetals.com).

The threaded ends 310A of tiebars 310 are screwed into the threaded recesses 300 in base plate 20. The tiebars 310 are orthogonal to base plate 20 and act as guides for assembly of fuel cell stack 30.

To protect fuel cell stack 30 components from being damaged during assembly as they are slid over tiebars 310 (in particular, over the threaded ends 310B of tiebars 310), threaded protection devices ("bullet end thread protection devices") 420 are threaded onto the threaded ends 310B of tiebars 310, allowing simple passing of fuel cell stack 30 components (e.g. repeat layers 70 and 90) over the tiebars 310 during assembly of fuel cell stack 30.

As detailed below, fuel cell stack assembly 10 comprises 99 electrochemically active fuel cell stack repeat layers 90, together with 6 electrochemically inactive fuel cell stack repeat layers 70 (as a first set 60 of 3 electrochemically inactive fuel cell stack repeat layers, and a second set 100 of 3 electrochemically inactive fuel cell stack repeat layers), and can achieve a sustained electrical power output of approximately 1 Kw. In other embodiments (not shown) with fuel cell stack assemblies with fewer fuel cell stack repeat layers 70, 90 (for example, having less than 20 electrochemically active fuel cell stack repeat layers 90), suitable materials also include Inconel®; Special Metals Corporation, US) tiebars coated with Apticote 800 (Poeton Industries Ltd, UK; www.poeton.co.uk) or equivalent Alumina based coatings.

Base plate 20 has a generally flat upper surface 20A upon which is mounted fuel cell stack 30. Electrically and thermally insulating mica based gasket 320 is mounted upon upper surface 20A of base plate 20, and provides electrical and thermal insulation between base plate 20 and the fuel cell stack layers placed on top of it.

A first set 60 of 3 electrochemically inactive fuel cell stack repeat layers 70 is then placed on top of electrically and thermally insulating gasket 320. As detailed above, each electrochemically inactive fuel cell stack repeat layers 70 comprises a metal substrate 220, a metal interconnect plate 150, and an inactive fuel cell spacer 151 between them. Electrically insulating gas seal gaskets 430, 440 are also included.

As detailed above, an oxidant flow path 230 is defined from oxidant inlet 240 to exhaust oxidant outlet 250.

Inactive fuel cell spacer 151 does not include a fuel inlet 200 (which would allow for fuel flow across the void 220A defined between the metal substrate 220 and the interconnect plate 150 towards exhaust fuel outlet 210). Instead, it includes a fuel gas flow manifold 200A which prevents fuel flow to void 200A whilst allowing fuel flow to and from adjacent components (substrate 220 and interconnect 150) of the electrochemically inactive fuel cell stack repeat layer 70.

Unlike the metal substrate 110 of electrochemically active fuel cell stack repeat layers 90, the metal substrate 220 of electrochemically inactive fuel cell stack repeat layers 70 does not include a porous region 110A, and does not have a fuel cell 91 with anode 120, electrolyte 130 and cathode 140 layers.

Negative power take off plate 330 is then placed on top of the first set 60 of electrochemically inactive fuel cell stack repeat layers 70, and has extending from it a negative power take off 331 which mates with baseplate electrical power feed-through 340 in base plate 20.

Negative power take off plate 330 is made from ferritic stainless steel such as grade 441. The thickness is 200 microns.

Suitable metals rated for IT-SOFC operation will be readily apparent to one of ordinary skill in the art.

In other embodiments, power take off plates have a thickness of 200-500 microns.

Electrically insulating gas seal gaskets 430, 440 are placed on top of negative power take off plate 330 to provide sufficient space for the underside current collector protrusions 150A of the metal interconnect plate 150 of subsequent fuel cell stack repeat layers 70, 90.

A set 80 of 99 electrochemically active fuel cell stack repeat layers 90 is then placed on top of monopole 330. Each electrochemically active fuel cell stack repeat layer 90 comprises a metal interconnect plate 150, electrochemically active fuel cell spacer 152, a metal substrate 110, a fuel cell 91 with anode, electrolyte and cathode layers (120, 130, 140 respectively) mounted upon metal substrate 110.

An oxidant flow path 160 is defined from oxidant inlet 170 to exhaust oxidant outlet 180.

Electrochemically active fuel cell spacer 152 includes a fuel inlet 200, allowing for fuel flow across the void 220A defined between metal substrate 220 and metal interconnect plate 150 towards exhaust fuel outlet 210. Thus, a fuel flow path 190 is defined from fuel inlet 200 to exhaust fuel outlet 210.

Endpole 350 is then placed on top of the set 80 of electrochemically active fuel cell stack repeat layers 90, and has extending from it a positive power take off 351 which mates with baseplate electrical power feed-through 360 in base plate 20.

A second set 100 of 3 electrochemically inactive fuel cell stack repeat layers 70 is then placed on top of endpole 350, and defines fuel cell stack second end 32.

Electrically and thermally insulating gasket 370 is then placed on top of fuel cell stack second end 32. Electrically and thermally insulating gasket 370 is as per electrically and thermally insulating gasket 320 and provides both electrical and thermal insulation (i.e. has limited thermal conductivity).

Hood 400 is then placed over fuel cell stack 30 so that it abuts skirt 20B which extends out of and about the circumference of base plate 20.

End plate 40 is placed on top of electrically and thermally insulating gasket 370.

A controlled uniaxial press (not shown) is used to exert a desired compressive force between end plate 40 and base plate 20 upon fuel cell stack 30 and thus achieve the required gas seal and electrical conductivity between components. In this state, a compressed height (i.e. distance from base plate 20 to end plate 40) of the fuel cell stack assembly 10 is achieved.

Once the required compression is achieved, it is held by the controlled uniaxial press, bullet end thread protection devices 420 are removed from threaded ends 310B of tiebars 310 and locking dome nuts 390 and washers 380 are located on the threaded ends 310B of tiebars 310. Locking dome nuts 390 are tightened to maintain the compressed height. The compression generated by the uniaxial press is then removed.

If it is desired to check the tightness on the locking dome nuts 390 to correct for any initial tensile relaxation generated by the first compression force take up by the clamping means 50, the compression force can be reapplied by the uniaxial press and any necessary measurements/changes made.

Tiebars 310 extend through end plate 40, and washers 380 and locking dome nuts 390 are then placed on the threaded ends of tiebars 310. Locking dome nuts 390 are tightened to exert a compressive force.

Thus, a clamping means 50 comprises a threaded recess 300 of base plate 20, a tiebar 310, and a locking dome nut 390.

End plate 40 also comprises a skirt 40A which extends out of and about the circumference of end plate 40. With end plate 40 placed on top of electrically and thermally insulating gasket 370 and clamping means 50 exerting compressive force upon fuel cell stack 30, hood 400 abuts skirt 40A.

Hood 400 is welded to base plate 20 and end plate 40 to provide a gas seal. A hood volume 410 is defined between base plate 20, end plate 40 and hood 400.

The negative power take off 331 and the positive power take off 351 pass through base plate 20 such that there is no electrical contact between them and base plate 20. This is achieved, by the use of electrical insulating inserts (not shown). These inserts are gas tight and chemically inert over the range of fuel cell stack operating temperatures.

At this stage of manufacture, an electrical and gas flow check is made on the fuel cell stack assembly 10 to check for assembly conformance.

As will be understood from the above description, electrochemically inactive fuel cell stack repeat layers 70 do not define a fuel flow path from a fuel inlet to an exhaust fuel outlet, and therefore there cannot be any fuel flow across them. This in turn means that irrespective of the presence of any other components or structures found in the electrochemically active fuel cell stack repeat layers 90, the fuel cell stack repeat layers 70 are electrochemically inactive.

The electrochemically inactive fuel cell stack repeat layers 70 are also referred to herein as "dummy cells".

In operation, at start-up a pre-heater (not shown) is used to heat inlet oxidant which is passed to both the electrochemically inactive repeat layers 70 and electrochemically active repeat layers 90, effecting heating of them in order to bring the electrochemically active repeat layers 90 up to an operational temperature and also reducing heat loss from electrochemically active repeat layers 90.

Heat exchangers (not shown) effect heat transfer from exhaust fluids/gases to inlet fluids/gases. In particular, heat exchange occurs between exhaust gases and inlet oxidant, resulting in heated oxidant being fed to oxidant inlet 170.

EMBODIMENT 2

In this specific embodiment, the general fuel cell stack assembly 10 is as per Example 1. However, the electrochemically inactive fuel cell stack repeat layers 70 of the second set of electrochemically inactive fuel cell stack repeat layers 100 are modified so as to prevent any fuel flow within them.

In this embodiment, inactive fuel cell spacer 151 is replaced with inactive fuel cell spacer 151A.

Figure 7:
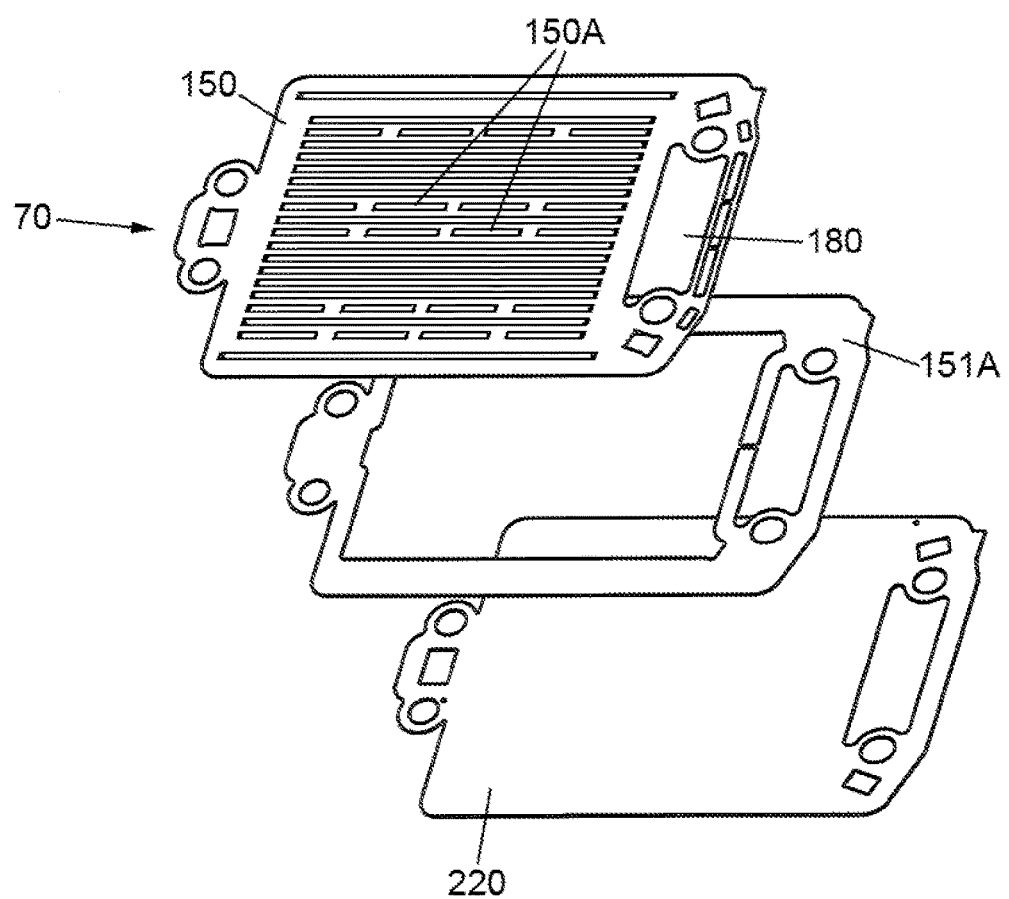
FIG. 7 shows an exploded view of an alternative electrochemically inactive fuel cell stack repeat layer.

As will be seen from FIG. 7, electrochemically inactive fuel cell stack repeat layer 151A does not include any fuel manifolding i.e. does not include fuel gas flow manifold 200A and does not include exhaust fuel outlet 210.

Since these repeat layers 151A are beyond the second end of the set of electrochemically active fuel cell stack repeat layers 80B, fuel is not required to flow past or through them to electrochemically active fuel cell stack repeat layers. Therefore, their lack of fuel manifolding does not have an adverse effect upon the performance of fuel cell stack assembly 10.

EMBODIMENT 3

In this specific embodiment, the component parts are generally as per Embodiment 1. However, as is illustrated in FIG. 8, the negative power take off plate 330 and the positive power take off plate 350 are located respectively between the fuel cell stack first end 31 and the electrically and thermally insulating gasket 320, and between the fuel cell stack second end 32 and the electrically and thermally insulating gasket 370.

EMBODIMENT 4

In this specific embodiment, the component parts are as per Embodiment 1 (and can also be as per Examples 2 or 3), and hood 400 is placed over fuel cell stack 30 and sealingly attached to base plate 20 and end plate 40 after the locking dome nuts 390 have been applied. Features of the base plate 20 and end plate 40 and/or dimensions and features of hood 400 are modified accordingly. A gas seal is achieved as per previous embodiments with a gas tight weld to the corresponding edge features of base plate 20 and end plate 40.

VARIOUS EMBODIMENTS

An illustrative view of an electrochemically active fuel cell stack repeat layer is shown in FIG. 12. FIG. 13 provides an illustrative view of an electrochemically inactive fuel cell stack repeat layer with an inactive fuel cell manifolding plate 151. FIG. 14 provides an illustrative view of an alternative electrochemically inactive fuel cell stack repeat layer, wherein the metal substrate 110 does not have a porous region 110A, and a fuel cell 91 (with anode, electrolyte and cathode layers 120, 130, 140) is not provided. Manifolding to other fuel cell stack repeat layers is not shown.

In various embodiments, metal substrate 220 of electrochemically inactive fuel cell stack repeat layers 70 is provided with a layer of bulk cathode material of the same thickness as the anode, electrolyte and cathode layers 120, 130, 140 of the electrochemically active fuel cell stack repeat layers 90.

EXAMPLE 1

In order to determine the effect of the incorporation of electrochemically inactive fuel cell stack repeat layers in a fuel cell stack assembly, comparative data was obtained from first and second intermediate-temperature solid oxide fuel cell stack assemblies.

The first intermediate-temperature solid oxide fuel cell stack assembly (referred to as being "With buffer inactive layers") is a fuel cell stack assembly as per Embodiment 1 (above).

The second intermediate-temperature solid oxide fuel cell stack assembly (referred to as being "Without buffer inactive layers") is identical to the first intermediate-temperature solid oxide fuel cell stack assembly except that it does not include any electrochemically inactive fuel cell stack repeat layers, i.e. does not include a first set of electrochemically inactive fuel cell stack repeat layers, and does not include a second set of electrochemically inactive fuel cell stack repeat layers.

In the experiments, both stack assemblies were run under identical steady-state conditions on a tall stack test stand with identical balance-of-plant equipment and identical testing/measuring equipment. Fuel and oxidant supply to both stack assemblies was identical, with the fuel being steam reformed natural gas. External electrical load across the fuel cell stack was 0.5 kW.

After a standard start-up procedure, both stacks were run at a steady state condition for 48 hours at a nominal 0.5 kW test point. The stack voltages were monitored during the whole test period.

The summary steady-state results are given in Table 1 (below). The detailed steady-state results are shown in FIG. 9.

As can be seen from the results, there is a significant increase in mean repeat layer voltage. The maximum repeat layer voltage also increases significantly, whilst there is an extremely substantial and significant increase in the minimum repeat layer voltage and corresponding reduction in the range of repeat layer voltages. The standard deviation in repeat layer voltage is correspondingly reduced Overall, this corresponds to a very significant improvement in fuel cell stack performance.

Notably, because the fuel cells of the repeat layers at the ends of the fuel cell stack are operating better, they are abler to consume more fuel, resulting in less unused fuel exiting the stack, resulting in an increase in electrical efficiency of the fuel cell stack by 1-2%, which improves the overall system efficiency.

A test system configuration was set for the fuel cell stack without the dummy repeat layers with a nominal 0.5 kW power output test point, operated with a fixed current load and monitoring of stack and cell voltages. An identical system configuration (including an identical fixed current load) was used for the fuel cell stack with the dummy repeat layers, and changes in power output determined as a function of changed cell voltages at the same current measurement point. Results show an increase in total power output of approximately 3.5% for the fuel cell stack with dummy repeat layers.

The same experiments were repeated for a nominal 1 kW power output test point, and results (not shown) were that an increase in total power output of approximately 6% for the fuel cell stack with dummy repeat layers.

TABLE 1

|  | With buffer inactive layers (mV) | Without buffer inactive layers (mV) | Difference |
|---|---|---|---|
| Mean | 837.3 | 809.0 | −28.3 |
| SD | 7.9 | 69.7 | 61.8 |
| Max | 851 | 835 | −16 |
| Min | 780 | 490 | −390 |
| Range | 71 | 345 | 274 |

Reference signs are incorporated in the claims solely to ease their understanding, and do not limit the scope of the claims. The present invention is not limited to the above embodiments only, and other embodiments will be readily apparent to one of ordinary skill in the art without departing from the scope of the appended claims.

REFERENCE SIGNS

10—fuel cell stack assembly
20—base plate
20A—base plate upper surface
20B—skirt
30—fuel cell stack
31—fuel cell stack first end
32—fuel cell stack second end
40—end plate
40A—skirt
50—clamping means
60—first set of electrochemically inactive fuel cell stack repeat layers
70—electrochemically inactive fuel cell stack repeat layer
80—set of electrochemically active fuel cell stack repeat layers
80A—first end of the set of electrochemically active fuel cell stack repeat layers
80B—second end of the set of electrochemically active fuel cell stack repeat layers
90—electrochemically active fuel cell stack repeat layer
91—fuel cell
100—second set of electrochemically inactive fuel cell stack repeat layers
110—metal substrate
110A—metal substrate porous region
110B—metal substrate non-porous region
120—anode layer
130—electrolyte layer
140—cathode layer
150—metal interconnect plate
150A—current collector protrusions
151—inactive fuel cell manifolding plate
151A—inactive fuel cell manifolding plate
152—electrochemically active fuel cell manifolding plate
160—oxidant flow path
170—oxidant inlet
180—exhaust oxidant outlet
190—fuel flow path
200—fuel inlet
200A—fuel gas flow manifold
210—exhaust fuel outlet
220—metal substrate [of electrochemically inactive fuel cell repeat layer]
220A—void
260—oxidant inlet
270—fuel inlet
280—exhaust oxidant outlet
290—exhaust fuel outlet
300—threaded recess
310—tiebar
310A—threaded end
310B—threaded end
320—electrically and thermally insulating gasket
330—negative power take off plate
331—negative power take off
340—baseplate electrical power feed-through
350—positive power take off plate
351—positive power take off
360—baseplate electrical power feed-through
370—electrically and thermally insulating gasket
380—washer
390—locking dome nut 400—hood
410—hood volume
420—bullet end thread protection device
430—electrically insulating gas seal gasket
440—electrically insulating gas seal gasket

The invention claimed is:

1. An intermediate-temperature solid oxide fuel cell stack assembly comprising:
   (i) a base plate;
   (ii) at least one intermediate-temperature solid oxide fuel cell stack mounted upon said base plate;
   (iii) an end plate; and
   (iv) clamping means adapted to exert compressive force upon said at least one fuel cell stack between said base plate and said end plate,
   each fuel cell stack having first and second ends, each fuel cell stack arranged mounted between said base plate and said end plate, and comprising at least one electrochemically active fuel cell stack repeat layer and at least one of:
      (a) an at least one electrochemically inactive fuel cell stack repeat layer positioned between said base plate and said at least one electrochemically active fuel cell stack repeat layer; and
      (b) an at least one electrochemically inactive fuel cell stack repeat layer positioned between said end plate and said at least one electrochemically active fuel cell stack repeat layer;
   each electrochemically active fuel cell stack repeat layer comprising a metal substrate, anode, electrolyte and cathode layers mounted upon said metal substrate, and a metal interconnect plate, a metal spacer located between said metal substrate and said metal interconnect plate, and defining an oxidant flow path from an oxidant inlet to an exhaust oxidant outlet, and a fuel flow path from a fuel inlet to an exhaust fuel outlet, and
   each electrochemically inactive fuel cell stack repeat layer adapted such that it is incapable of performing an electrochemical function and comprising a metal substrate, anode, electrolyte and cathode layers mounted upon said metal substrate, and a metal interconnect plate, a metal spacer located between said metal substrate and said metal interconnect plate, and defining an oxidant flow path from an oxidant inlet to an exhaust oxidant outlet.

2. The intermediate-temperature solid oxide fuel cell stack assembly according to claim 1, wherein said at least one electrochemically inactive fuel cell stack repeat layer comprises a plurality of electrochemically inactive fuel cell stack repeat layers, and both:
   (a) at least one of said electrochemically inactive fuel cell stack repeat layers is positioned between said base plate and said at least one electrochemically active fuel cell stack repeat layer; and
   (b) at least one of said electrochemically inactive fuel cell stack repeat layers is positioned between said end plate and said at least one electrochemically active fuel cell stack repeat layer.

3. The intermediate-temperature solid oxide fuel cell stack assembly according to claim 2, wherein each fuel cell stack, arranged in a direction from said base plate to said end plate, comprises:
   (A) a first of said electrochemically inactive fuel cell stack repeat layers;
   (B) said at least one electrochemically active fuel cell stack repeat layer; and
   (C) a second of said electrochemically inactive fuel cell stack repeat layers.

4. The intermediate-temperature solid oxide fuel cell stack assembly according to claim 1, wherein said metal substrate is formed from a sheet or foil.

5. The intermediate-temperature solid oxide fuel cell stack assembly according to claim 4, wherein said metal spacer of at least one of said electrochemically inactive fuel cell stack repeat layers is configured to block fuel flow from said fuel inlet to said exhaust fuel outlet.

6. The intermediate-temperature solid oxide fuel cell stack assembly according to claim 1, additionally comprising at least one electrically insulating gasket being located between an adjacent pair of said fuel cell stack repeat layers.

7. The intermediate-temperature solid oxide fuel cell stack assembly according to claim 1, wherein each of said fuel cell stack repeat layers is adjacent to at least one other of said fuel cell stack repeat layers, and additionally comprising at least one electrically insulating gasket being located between each of said adjacent fuel cell stack repeat layers.

8. The intermediate-temperature solid oxide fuel cell stack assembly according to claim 1, additionally comprising at least one of:
   (a) an endpole located between a first of said at least one electrochemically inactive fuel cell stack repeat layer and said at least one electrochemically active fuel cell stack repeat layer; and
   (b) an endpole located between a second of said at least one electrochemically inactive fuel cell stack repeat layer and said at least one electrochemically active fuel cell stack repeat layer.

9. The intermediate-temperature solid oxide fuel cell stack assembly according to claim 1, wherein said at least one intermediate-temperature solid oxide fuel cell stack is a planar fuel cell stack.

10. The intermediate-temperature solid oxide fuel cell stack assembly according to claim 1, additionally comprising a hood defining a hood volume containing said at least one intermediate-temperature solid oxide fuel cell stack.

11. The intermediate-temperature solid oxide fuel cell stack assembly according to claim 10, further comprising said hood being sealingly attached to said base plate and defining at least a portion of said hood volume between said base plate and said hood.

12. The intermediate-temperature solid oxide fuel cell stack assembly according to claim 11, further comprising said hood additionally being sealingly attached to said end plate and defining said hood volume between said base plate, said end plate and said hood.

13. The intermediate-temperature solid oxide fuel cell stack assembly according to claim 1, additionally comprising a thermally and electrically insulating gasket mounted between at least one of:
   (a) said base plate and said at least one fuel cell stack; and
   (b) said end plate and said at least one fuel cell stack.

14. The intermediate-temperature solid oxide fuel cell stack assembly according to claim 1, wherein said base plate and said end plate are electrically isolated from said at least one electrochemically active fuel cell stack repeat layer.

15. The intermediate-temperature solid oxide fuel cell stack assembly according to claim 1, additionally comprising first and second endpoles in electrical contact with said at least one electrochemically active fuel cell stack repeat layer, and wherein said base plate and said end plate are electrically isolated from said at least one electrochemically active fuel cell stack repeat layer.

16. The intermediate-temperature solid oxide fuel cell stack assembly according to claim 15, wherein said first endpole is part of the electrochemically active fuel cell stack repeat layer closest to said baseplate.

17. The intermediate-temperature solid oxide fuel cell stack assembly according to claim 15, wherein said second endpole is part of the electrochemically inactive fuel cell stack repeat layer adjacent to the electrochemically active fuel cell stack repeat layer closest to said end plate.

18. A method of operating the intermediate-temperature solid oxide fuel cell stack assembly of claim 1, the method comprising the steps of:
(a) feeding fuel and oxidant to respective fuel and oxidant inlets to said intermediate-temperature solid oxide fuel cell stack assembly; and
(b) operating said intermediate-temperature solid oxide fuel cell stack assembly to oxidise said fuel with said oxidant and generate electricity.

* * * * *